United States Patent
Goebel et al.

(10) Patent No.: US 6,757,668 B1
(45) Date of Patent: Jun. 29, 2004

(54) INFORMATION FUSION OF CLASSIFIERS IN SYSTEMS WITH PARTIAL REDUNDANT INFORMATION

(75) Inventors: Kai Frank Goebel, Ballston Lake, NY (US); Malcolm John Ashby, Hamilton, OH (US); Vivek Venugopal Badami, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 460 days.

(21) Appl. No.: 09/704,476

(22) Filed: Nov. 3, 2000

Related U.S. Application Data

(60) Provisional application No. 60/163,723, filed on Nov. 5, 1999.

(51) Int. Cl.[7] .......................... G06F 17/00; G06N 7/00; G06N 7/08
(52) U.S. Cl. ............................. 706/59; 706/47; 706/61
(58) Field of Search .............................. 706/47, 59, 61

(56) References Cited

U.S. PATENT DOCUMENTS

| | | | |
|---|---|---|---|
| 5,806,052 A | | 9/1998 | Bonissone et al. |
| 5,960,430 A | | 9/1999 | Haimowitz et al. |
| 5,991,743 A | | 11/1999 | Irving et al. |
| 6,102,958 A | * | 8/2000 | Meystel et al. ............... 703/2 |

OTHER PUBLICATIONS

A Model–Based Approach to Information Fusion, Nelson et al., Defense Science and Technology Organization, (Proceedings of Information, Decision, and Control, 1999) pp. 395–400.

Pitfalls in Data Fusion (and how to avoid them), Hall & Garga, Applied Research Lab., Penn.State University (2nd Int. Conf. on Information Fusion) 1999, pp. 429–436.

Hybrid Soft Computing Systems: Industrial and Commercial Applications Bonissone, et al. , Proceedings of the IEEE, vol. 87, #9, 09/99 pp. 1641–1665.

Fuzzy Sensor Fusion for Gas Turbine Power Plants, Goebel et al. pp. 52–61, GE Corp. Research & Devel., (Proceedings of SPIE, Sensor Fusion . . . , 1999.

Towards A theoretical Framework For Multi–Layer Decision Fusion, Rahman et al., pp. 711–717. Electronic Engineering Lab, University of Kent, Canterbury, Kent, UK (IEE Third European Workshop on Handwriting Analysis & Recognition, 1998).

Decision Fusion by Fuzzy Set Operations, Loskiewicz–Buczak et al. Dept. of Nuclear Eng., University on Fuzzy Systems, 1994) vol. 2, pp. 1412–1417.

(List continued on next page.)

*Primary Examiner*—Ramesh Patel
*Assistant Examiner*—Joseph P. Hirl
(74) *Attorney, Agent, or Firm*—David C. Goldman; Patrick K. Patnode

(57) ABSTRACT

The present invention provides methods and tools to aggregate information stemming from a plurality of different classification tools and supportive evidential information to arrive at a unified classification estimate. The information fusion system according to the present invention has a plurality of sensors associated with the system, where each sensor is related to at least one class of the system and is data-related to the at least one class. A plurality of classification tools are each designed to receive selected and pre-processed outputs from the sensors and to generate classification outputs representing a state of at least one class of the system. An information fusion tool is configured to receive the outputs of the classification tools as well as evidential information as inputs, and has an hierarchical architecture which manipulates the inputs to generate an output of aggregated fused information for a particular class of the system.

31 Claims, 12 Drawing Sheets

OTHER PUBLICATIONS

A Parametric Model for Fusing Heterogeneous Fuzzy Data, Hathaway et al. (IEEE Transactions on Fuzzy Systems, vol. 4, No. 3, Aug. 1996) pp. 270–281.

Fuzzy Prediction of Timeseries, Khedkar et al., CS Div., Dept. of EECS, University of California at Berkeley & Intl. computer Science Institute (IEEE, 1992) pp. 281–288.

An Architecture for Fuzzy Sensor Validation and Fusion for Vehicle Following in Automated Highways, Goebel et al. University of CA at Berkeley, Dept. of Mechanical Engineering, (Proceedings of the 29th ISATA, Florence, Italy, 1996), 6 pages.

Diagnostic Information Fusion: Requirements Flowdown and Interface Issues, Goebel, et al. GE Corp. Research & Development (Proceedings of the IEEE Aerospace Conference, 2000) 8 pages.

Decision Forgetting and Decision Smoothing for Diagnostic Decision Fusion in Systems with Redundant Information, Goebel, 8 pages. G.E. Corporate Research & Development (Proceedings of the SPPE Data Fusion, Technologies, Tools, & Architecture IV, Aeros. 2000, Orlando, Fl).

Decision Fusion Approach for Multitemporal Classification, Jeon et al. p 1227–1233 (IEEE Transactions on Geoscience & Remote Sensing, vol. 37, No. 3, 05/99).

Intelligent Maintenance Advisor for Turbine Engines (IMATE), Ashby et al. (Proceedings of the IEEE Aerospace Conf., 2000) 9 pages.

\* cited by examiner

Fading Exponent = f(confidence value)

Example:
— confidence$_{blue}$(1)=0.8
--- confidence$_{green}$(1)=0.2

INFORMATION FUSION OF CLASSIFIERS IN SYSTEMS WITH PARTIAL REDUNDANT INFORMATION

CROSS REFERENCE TO RELATED APPLICATIONS

The present application claims priority to Provisional Application U.S. Serial No. 60/163,723 filed Nov. 5, 1999.

STATEMENT REGARDING FEDERALLY FUNDED RESEARCH AND DEVELOPMENT

This research was in part supported by DARPA project MDA972-98-3-0002. The Government has certain rights in this invention.

FIELD OF THE INVENTION

The present application relates generally to information aggregation and more particularly to methods and tools used to aggregate at least partially redundant information developed by different classification tools, also called classifiers, to arrive at a unified estimate concerning the state of a system.

BACKGROUND OF THE INVENTION

The field of classification encompasses a wide range of disciplines including fault diagnosis, pattern recognition, modeling, and clustering, among others. A classification tool is used to analyze data through categorization into different classes. This may be accomplished using generalizations over the records of a training data set, which distinguish predefined classes to predict the classes of other unclassified records.

An issue that can make classification a difficult task is the dynamic nature of many systems. As a system signature changes, it escapes the carefully partitioned regions of a specific classification tool. Efforts such as adaptive classification attempt to cope with this challenge. An added level of complexity comes through the integration and aggregation of redundant information which has to be ranked based on its integrity.

In the case of dynamic systems, the aggregation scheme has to deal with several issues including temporally disjointed information, which is information produced at different sampling frequencies. For example, some classification tools may operate at a millisecond sample period while others give only one estimate at a specific phase of system operation. This situation is a problem when a significant event occurs between the estimate of one classification tool and the estimate of another classification tool.

To illustrate, consider two classification tools A and B. At a base case both tools render their information at the same time. Tool A can only establish whether or not event x is present while tool B can detect events x and y. Tool A can identify event x very reliably while tool B's performance is only mediocre. If event x occurs, there is a high likelihood that tool A indicates event x and also a lesser likelihood that tool B indicates event x. If both tools indicate event x there is reasonable certainty that event x did indeed occur. If tool B indicates event y one might be tempted to choose event x because of the good performance of tool A. However, should event y occur—of which tool A knows nothing about—tool A will always misdiagnose that event as either event x or a nil event. Tool B will perform its mediocre job by sometimes indicating event y correctly. The decision makers (maintenance personnel, fleet management, etc.) faces the quandary which tool to believe. They only see that (otherwise reliable) tool A indicates event x (or nil) while tool B indicates event y (or worse, since it is not highly reliable, sometimes event x). Incorrect classification is the likely result with traditional averaging and voting schemes.

Now assume that first tool A carries out its job, then tool B. Consider that first event x is present and event y occurs after tool A has completed its classification task but before tool B. An added problem is that both tools could perform correctly and that an a priori discounting of tool B's estimate is not appropriate. Rather, the temporal nature of the information has to be taken into account.

Today, service providers and manufacturers develop different classification tools to accommodate particular classification needs. These different tools are sometimes employed either for successive implementation to achieve better class coverage, or to obtain a better overall classification result. Classification tools are deployed in this manner because any one tool cannot deal with all classes of interest at the desired level of accuracy. For example, certain classification tools respond to environmental changes with less deterioration of their classification capabilities than others; some cannot easily be expanded to include new classes of investigation; some have a high reliability at detecting certain classes of faults but are not reliable for others. This patchwork approach achieves optimization at the component level, but ignores benefits gained by taking a system-level view.

In order to obtain this system-level view, information fusion technology gathers and combines the results of different classification tools to maximize the advantages of each individual tool while at the same time minimizing the disadvantages. Fusion schemes strive to deliver a result that is better than the best result possible by any one tool used. In part this can be accomplished because redundant information is available, and when correctly combined improves the estimate of the better tool and compensates for the shortcomings of the less capable tool.

Information fusion tools typically do not know whether an event occurs. As far as such tools are concerned, either one estimate is bad (and it does not know a priori which one that is) or the tools are right and something has happened. But even in a static case, that is, when classification tools provide their opinion to a fusion tool at the same time, there are a number of issues which need to be addressed. The trivial case is when several classification tools agree on the state of a class. In this situation the resulting output carries a high degree of confidence. However, if the classification tools disagree, a decision must be made as to which tool to believe or to what degree. In addition, information may be expressed in different domains, such as but not limited to probabilistic information, fuzzy information, binary information, etc. The fusion scheme needs to map the different domains into a single common domain to properly use the data. The fusion scheme also has to deal with tools that are operated at different sampling frequencies.

The majority of existing information fusion tools and techniques are configured using known classification tools. Essentially, these fusion tools perform a classification of the classification tools. For example, raw data is provided to a plurality of classification tools, and the outputs of these classification tools are in turn provided to a single classification tool which functions as the "fusion tool". The fusion tool uses the outputs from the classification tools as an input pattern for its operation. Thus, the fusion tool simply receives the output from plurality of classification tools as an input pattern, and based on the input pattern, determines a certain classification. Such a system is classifying the received combination of outputs from the plurality of classification tools to represent a particular class. This design simply elevates the classification process away from the raw data by adding an interim process between the raw data (generated, for example, by known sensors) and the fusion tool (i.e., a known classification tool being used as a fusion tool).

Information fusion is a relatively new field, with many areas of opportunity uninvestigated, including the use of information fusion for the diagnosis of faults in a system.

In consideration of the foregoing, it has been determined desirable to develop a fusion tool that gathers the output of different classification tools and leverages the advantages of each of the outputs. Such a tool should take into consideration that individual classification tools may provide information in different domains, at different operational frequencies, have different reliability, provide different fault coverage, and may generate results which conflict with other tools. It will also be useful for the fusion tool to take into consideration the operational regimes of a system being investigated, and the need to consider secondary information related to the system.

SUMMARY OF THE INVENTION

The present invention provides methods and tools to aggregate information stemming from different classification tools and supportive evidential information to arrive at a unified classification estimate. The information fusion system includes a plurality of sensors associated with the system where each sensor is related to at least one class of the system, and which sense data related to the at least one class. A plurality of classification tools are each designed to receive selected pre-processed outputs from the sensors and to generate classification outputs representing a state of at least one class feature of the system. An information fusion tool is configured to receive the outputs of the classification tools as well as evidential information as inputs, and has an hierarchical architecture which manipulates the inputs to generate an output of aggregated fused information for a particular class of the system.

DETAILED DESCRIPTION OF THE PREFERRED EMBODIMENT

Figure 1:
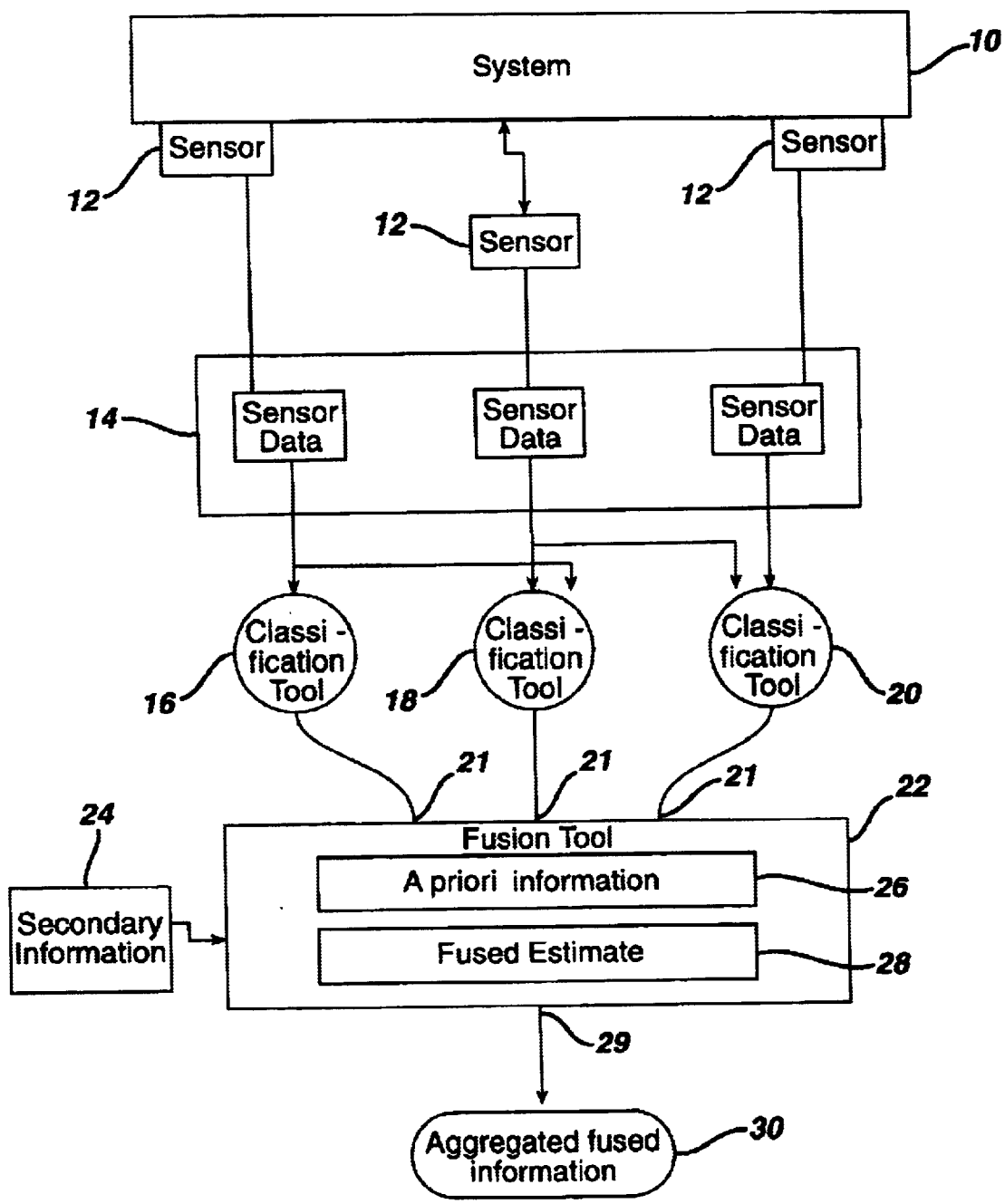
FIG. 1 is an overall block diagram of a system implementing the information fusion tool of the present invention.

Turning to FIG. 1, a high-level block diagram illustrates the overall design concepts and flow of the present invention. System 10 represents a machine or process to which the present invention is applied, and may be any system under test where it is desirable to obtain fault or other classification information. Sensors 12 are associated with the system and are configured to obtain data on system operation. Association of sensors 12 to system 10 may be by a direct physical connection, or a remote connection to system 10 in order to acquire information concerning system operation.

One or more sensors are associated with system 10, and each sensor will sense one or more classes associated with the functioning of system 10. A limited example of class features which may be sensed, include but are not limited to pressure, temperature, software faults, hardware faults, air flow, fluid flow, speed, or any other classifiable feature. The sensors 12 generate raw sensor data 14, which are selectively obtained by classification tools 16–20. As illustrated in FIG. 1, a single classification tool can obtain raw data from a single sensor or from multiple sensors. Classification tools 16–20 may be any of those that are well known in the art, and may include tools based on neural networks, decision trees, if-then-rules, k-means classifiers, k-nearest-neighbor (knn) classifiers, fuzzy networks, Bayesian Belief Nets, among others.

Outputs from classification tools 16–20 provided to inputs 21 to a fusion tool 22, configured in accordance with the teachings of the present invention. Also provided to fusion tool 22 is secondary evidential information 24 regarding the system. A priori information 26 concerning characteristics of individual classification tools 16–20 and system 10, may also be beneficially used. Fusion tool 22 generates fused intermediate estimates 28 which are further operated upon to produce a final output, via output 29, of aggregated fused information 30 for a particular class of system 10.

Figure 2:
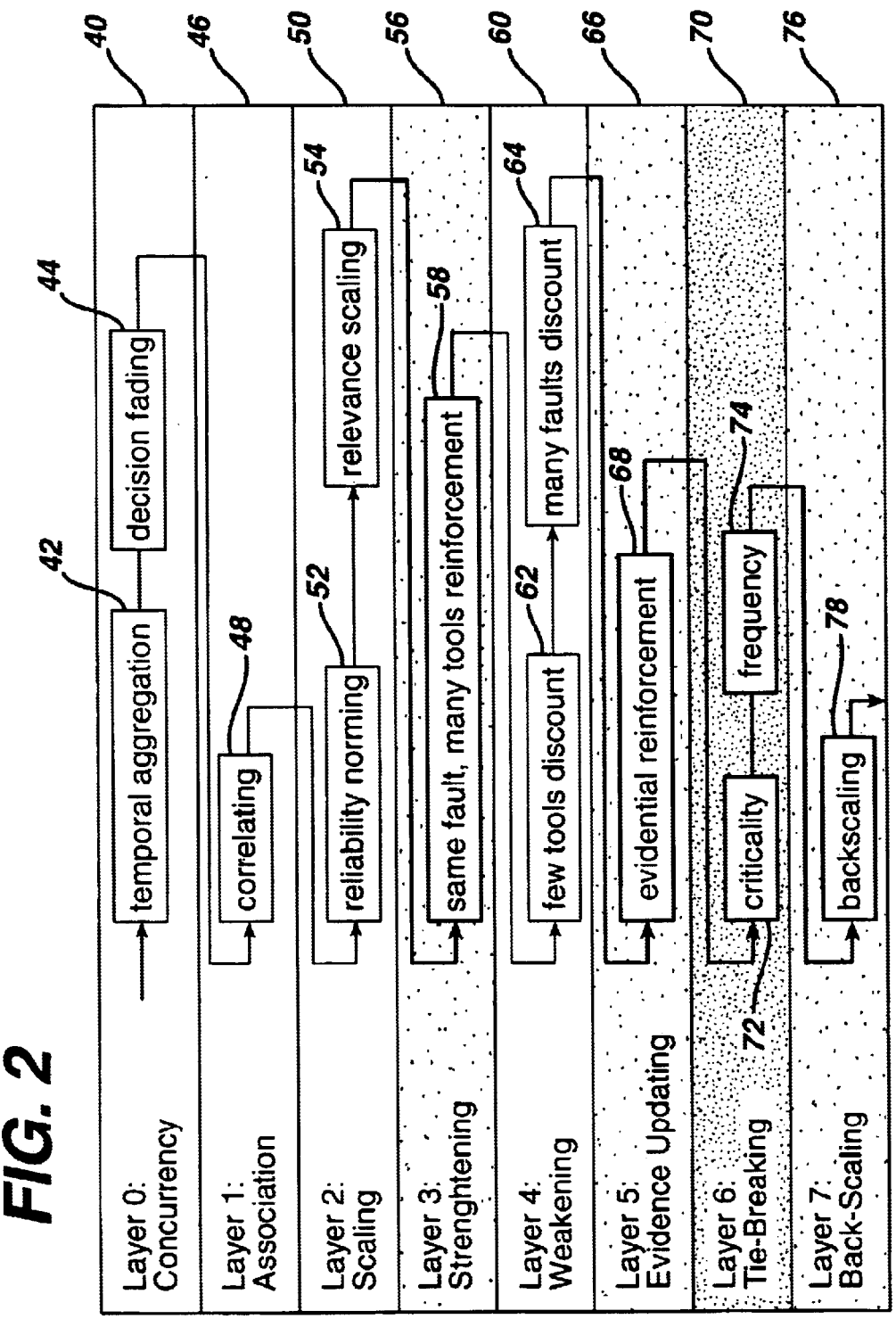
FIG. 2 describes a fusion algorithm process map of the fusion tool of the present invention.

As shown in FIG. 2, a first embodiment of fusion tool 22 is designed in a hierarchical architecture which initially manipulates information from the classification tools 16–20 and later the fused estimate 28, sequentially, until the most likely candidate class has been refined. In particular, this is a process that increases and decreases the weight values given to the classes according to the strategies implemented in respective layers of fusion tool 22. This design allows some classes to emanate as winners from one layer, only to be overruled in the next layer. The architecture displayed in FIG. 2 shows there are eight layers of fusion tool 22. The first is concurrency layer 40, which is a pre-processing step to the main fusion operations.

Concurrency layer 40 uses a temporal aggregation module 42, to perform aggregation of information over time and collect information before the main information fusion process is triggered. In addition, concurrency layer 40 uses a decision fading module 44 to perform an information fading operation, when certain temporal conditions are met. Association layer 46 exploits information about preferred misclassifications of a classification tool, using correlating module 48. In scaling layer 50, integration of a priori information regarding the performance of a classification tool occurs through the use of a reliability norming module 52 and relevance scaling module 54. Strengthening layer 56 reinforces an opinion about a class when several classification tools indicate the same state of a class, such as the existence of a fault. This process is accomplished in strengthening layer 56, by use of reinforcement module 58. Weakening layer 60 discounts information if several tools disagree on the classification state, and it also discounts information if any classification tool indicates several classes at the same time, by use of a few tools discount module 62 and a many faults discount module 64.

An evidence updating layer 66 incorporates secondary evidential information, which is not generated by a classification tool, via evidential reinforcement module 68. This type of information is used only to support a classification state, not to discount a classification state. Tie-breaking layer 70 deals with high ranking system states (e.g., faults) having similar confidence levels. It employs two strategies: one is to provide a higher weight value to a class that traditionally occurs more often (i.e., frequency module 72); the other is to weigh a class state (e.g., a fault) higher if it is more critical to successful operation of the system (i.e., criticality module 74). Backscaling layer 76 performs a transformation, by backscaling module 78, which makes the fused information interpretable to an end user.

In addition to information from classification tools 16–20, a priori information 26 which may be information regarding the historical performance of individual classification tools or of the system is used by fusion tool 22 to arrive at a fused information output. The a priori information is obtained through experiments, simulations or actual performance evaluations.

One source of a priori information 26 is obtained from a confusion matrix, which is a performance measure for an individual classification tool. An example of a confusion matrix is shown in Table 1, which lists seven real classes ($C_0$–$C_6$) versus corresponding estimated classes ($\hat{C}_0$–$\hat{C}_6$), where 1000 experiments were carried out for each class. Because all classes (in this example fault classes) of the classification tool are enumerated, it is possible to obtain information not only about correctly classified fault states, but also about the false positive (FP) states, which declare a good system faulted; false negative (FN) states which declare a faulted system good; and false classified (FC) states which misclassify a detected fault. In Table 1, the diagonal entries (853, 710, 885, 512, 673, 819, 800) represent the correctly classified cases. For example, 853 represents that the classification tool in question correctly detected 853 $C_0$ class faults; correctly detected 710 $C_1$ class faults; 885 class $C_2$ faults, . . . , and 800 $C_6$ class faults. The first row ($C_0$)—except the first entry—contains the FP states. The first column ($\hat{C}_0$)—except the first entry—contains the FN states. The off-diagonal elements—except the FP and FN—represent FC states.

A pre-requisite to using the information found in a confusion matrix, is the evaluation of the classification tool even for cases it cannot detect. For situations where this information cannot be obtained, the information gleaned from the confusion matrix must be derated, meaning less weight will be given to the results of the matrix.

TABLE 1

Confusion matrix for a classifier

|  | $\hat{C}_0$ | $\hat{C}_1$ | $\hat{C}_2$ | $\hat{C}_3$ | $\hat{C}_4$ | $\hat{C}_5$ | $\hat{C}_6$ |
|---|---|---|---|---|---|---|---|
| $C_0$ | 853 | 1 | 15 | 26 | 32 | 2 | 71 |
| $C_1$ | 2 | 710 | 146 | 31 | 96 | 0 | 15 |
| $C_2$ | 58 | 0 | 885 | 19 | 21 | 1 | 16 |
| $C_3$ | 26 | 0 | 34 | 512 | 422 | 2 | 4 |
| $C_4$ | 117 | 0 | 6 | 160 | 673 | 0 | 44 |
| $C_5$ | 4 | 0 | 59 | 62 | 28 | 819 | 28 |
| $C_6$ | 141 | 0 | 20 | 4 | 15 | 20 | 800 |

Another source of a priori information is through the use of a relevance matrix, such as illustrated by Table 2. Relevance is an assignment of whether a specific classification tool can perform a classification on a per class basis. Relevance means a tool is capable of diagnosing a fault class and is indicated by "1", no relevance is represented by "0". Relevance can be summarized for all tools in a relevance matrix. Table 2 is an example for three tools $t_1$ through $t_3$ and seven classes ($C_0$–$C_6$). The matrix of Table 2 illustrates tool $t_1$ might detect class faults $C_0$–$C_4$ but cannot detect $C_5$, $C_6$; $t_2$ might detect all class faults; and $t_3$ might detect all but class fault $C_5$.

TABLE 2

Relevance assignment of tools

|  | $C_0$ | $C_1$ | $C_2$ | $C_3$ | $C_4$ | $C_5$ | $C_6$ |
|---|---|---|---|---|---|---|---|
| $t_1$ | 1 | 1 | 1 | 1 | 1 | 0 | 0 |
| $t_2$ | 1 | 1 | 1 | 1 | 1 | 1 | 1 |
| $t_3$ | 1 | 1 | 1 | I | 1 | 0 | 1 |

Figure 3:
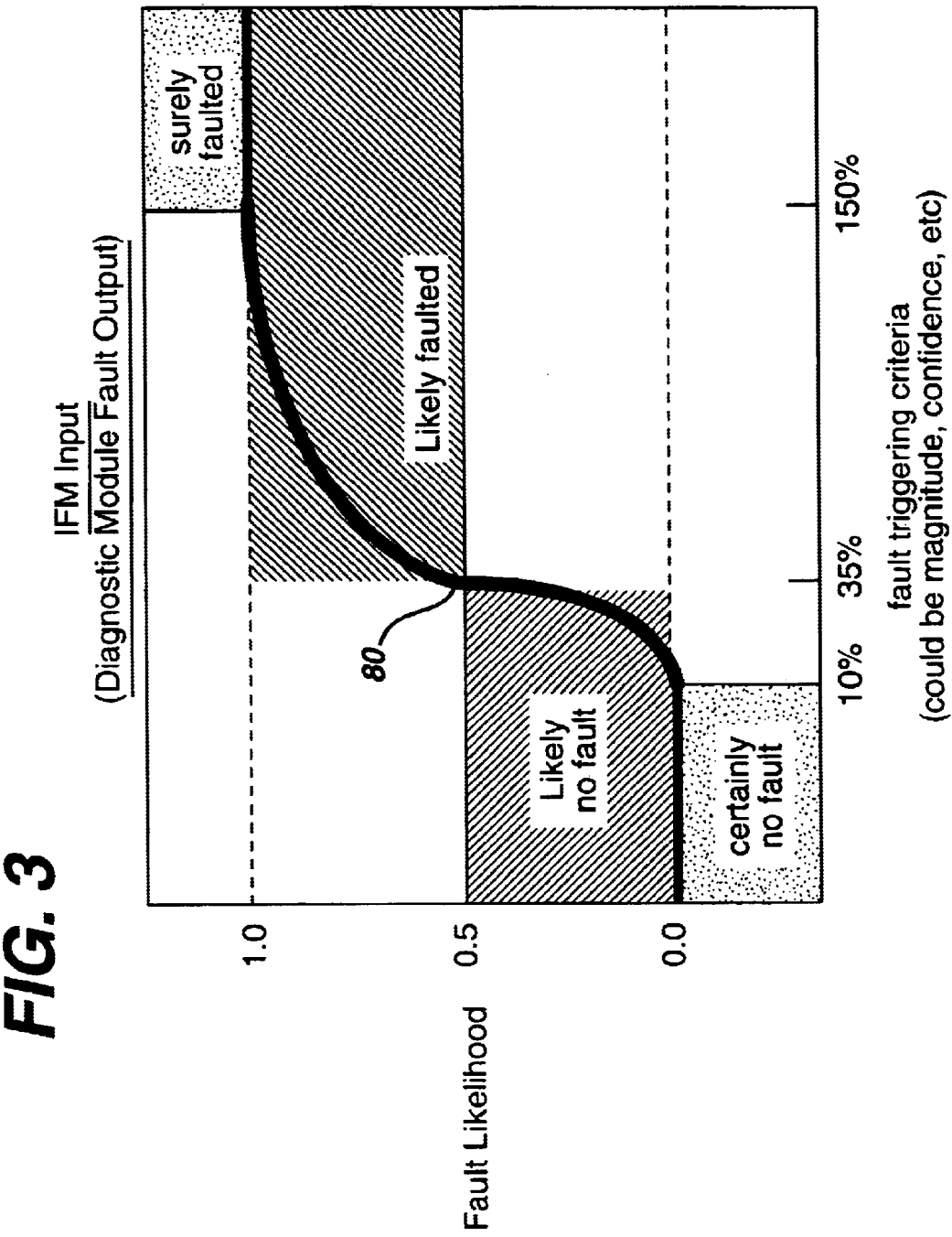
FIG. 3 is a diagnostic module fault output graph.

As discussed, the inputs to fusion tool 22 include the outputs from the classification tools 16–20, i.e., the class vector for all classes considered. Instead of crisp class assignment, information can be utilized that leads to the class assignment, and may be a distance measure (for example for a k-means classifier), probability (for example for a Bayesian Belief Net), weight (for example for a neural net), membership (for example for a fuzzy knn), etc. As depicted in FIG. 3, this individual assignment criterion is then scaled between "0" and "1" using an appropriate classification tool specific non-linear function. The interpretation is that a level closer to 1 means the fault is increasingly more likely while a confidence level less than 0.5 indicates the fault is increasingly not likely. In one embodiment the designer of the classification (e.g., diagnostic) tools designs the tools to provide the mapping from a diagnostic output to a confidence level for the fusion tool 22.

In FIG. 3, which depicts one example of mapping information from a diagnostic domain of a diagnostic tool to the fusion input domain, the "y" axis represents the likelihood of a fault for a specific class, scaled from 0 to 1. The "x" axis provides a percentage scale for the existence of a criteria for triggering a class. Curve 80 is generated by a non-linear function for a specific classification tool. As class likelihood and class triggering criteria increase, the likelihood of reliable fault detection increases. As noted, the mapping process is classification tool dependent, where, for example, a probability classification tool is mapped using criteria different from that which would be used for a neural network mapping. Thus, the class triggering criteria are any criteria appropriate for a specific diagnostic tool. The mapping process can be as straight forward as a binary mapping from the domain of the particular classification tool to the fusion domain. However, using a binary mapping will result in a loss of refinement in the fusion scheme.

Another source of a priori information for fusion tool 22 is from a reliability matrix, which is generated from the confusion matrix in a two step process. First, the elements of the confusion matrix are brought into a normalized format through normalization such that the horizontal entries add up to one. Then, the off-diagonal elements are modified to reflect the reliability by which they report the respective state of a class correctly. This is accomplished by taking 1 minus the misclassification (1-misclassification) rate. Finally, the reliabilities are bounded to a lower value (e.g. 0.001) and upper value (e.g. 0.999) such that no entry reflects perfect performance. An example of this transformed table is illustrated in a following section of this document related to a specific implementation of the invention.

Figure 4:
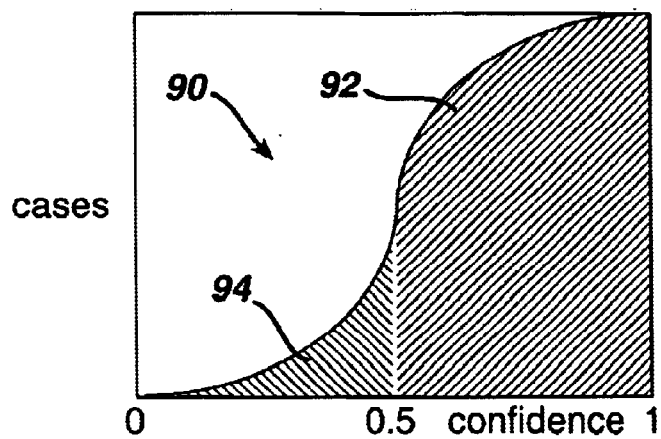
FIG. 4 illustrates a performance evaluation for outputs of classification tools.

FIG. 4 shows a classification output 90 simulated by assuming a Gaussian distribution of class recognition. That is, if the reliability of the tool for a specific class was given as 0.8 (i.e. 800 for intersect $C_6$, $\hat{C}_6$ of Table 1) in the diagonal entry of the confusion matrix, then 80% of the classes 92 are between confidence 0.5 and 1. The other 20% of the classes 94 are between 0 and 0.5.

All layers (40, 46, 50, 56, 60, 66, 70 and 76) of fusion tool 22 are, where possible, evaluated on a stand-alone basis. This is done to evaluate the contribution of each layer in isolation and to ensure that only layers are used that have a positive impact on reducing the overall error. Thus, fusion tool 22 does not require each layer to be used in each implementation. Rather, situations may exist where only a single layer, or some sub-combination of all layers, generate the most effective results.

Figure 5:
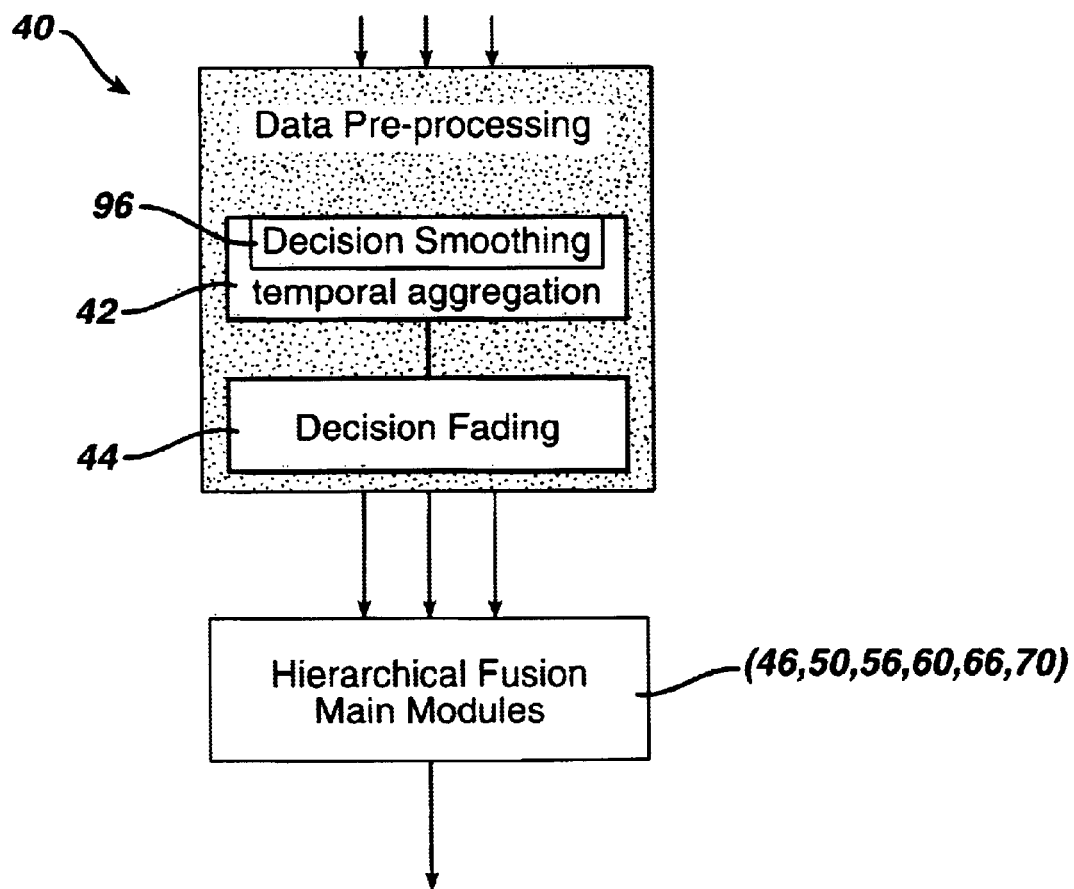
FIG. 5 depicts the concurrency layer of FIG. 2 in more detail.

Turning now to a more detailed discussion of the layers of fusion tool 22, FIG. 5 illustrates a view of concurrency layer 40 which includes a decision smoothing module 96 as part of temporal aggregation module 42. As previously discussed, concurrency layer 40, pre-processes the information from classification tools 16–20, prior to being provided to main layers (46, 50, 56, 60, 66, 70) of fusion tool 22.

A particular challenge faced in dynamic systems is providing a different reaction to situations where decisions agree and situations where decisions disagree. When decisions agree, and in the absence of evidence to the contrary, there is no reason for fusion tool 22 to change the collective opinion within that time step (there is still a minute chance of joint incorrect classification). However, if classification tools 16–20 disagree, fusion tool 22 must act to determine whether one classification tool is correct and the other or others are not, and whether an event has occurred between operation of the different classification tools. To assist in this situation, fusion tool 22 is supported by removing outliers (information outside of an accepted range), by smoothing decisions of individual classification tools in situations of agreement, and by updating decisions quickly when a changed event is indicated. Note that we use decisions and classes here interchangeably. This illustrates the need to provide a system status recognition tool which allows these two strategies to work side by side.

The concept of decision smoothing is implemented in decision smoothing module 96, via an exponential averaging time series filter with adaptive smoothing parameter. The filter of this embodiment is expressed as:

$$x(k)=\alpha x(k-1)+(1-\alpha)y(k) \quad \text{Eq. 1}$$

where x(k) and x(k−1) are the filtered decisions at time k and k−1, respectively α is the smoothing parameter y(k) is the new incoming decision An adaptive filter—which is accomplished by changes to the smoothing parameter—allows weeding out noise and outliers when no fault has occurred, and also allows for quick reaction to changes from one event to another. Therefore, if everything is calm, the smoothing parameter is large (to remove noise); if something is happening, the strategy is to be more cautious, and reduce the smoothing parameter value. The reduction is accomplished with the help of an intermittency factor. This factor can be interpreted as a sentinel which monitors system changes. The sentinel checks if the status of a decision changes and keeps track of these changes. First, a change counter establishes whether there is a change of class opinion compared to the last one. If the change counter is greater than zero, an intermittency factor is computed dividing the change counter by some user defined sentinel window. The sentinel window is a running window that is initially small to allow operation even when there is only one measurement. This implies that initially, the parameter will be more receptive to changes. When more values become available, the window increases and the decision smoothing becomes more temperate. This also means that in general, more information is better under this paradigm because longer and more refined smoothing can take place. The change counter, intermittency factor, and sentinel window may also be components of decision smoothing module 96. The smoothing parameter α is calculated by:

$$\alpha=(1-\text{intermittency})^{\text{constriction\_exponent}} \quad \text{Eq. 2}$$

where the constriction_exponent scales α and is a value>1

Additionally, α is bounded between a lower and upper value to ensure that the filter becomes neither too sluggish nor too responsive. The filtered decision is then calculated by the exponential filter:

$$\text{filtered\_decision}=\alpha \cdot \text{filtered\_decision}+(1-\alpha)\cdot \text{new\_decision} \quad \text{Eq. 3}$$

In decision or information fading module 44, a forgetting factor is employed that has the effect of reducing the sensitivity of the parameter when no changes have been observed for a time period, allowing the algorithm to settle to its smoothing task. In this embodiment, the forgetting factor is a value less than 1, and is computed over time as:

$$\text{change\_count}=\text{change\_count}\cdot\text{forgetting\_factor} \quad \text{Eq. 4}$$

Figure 6:
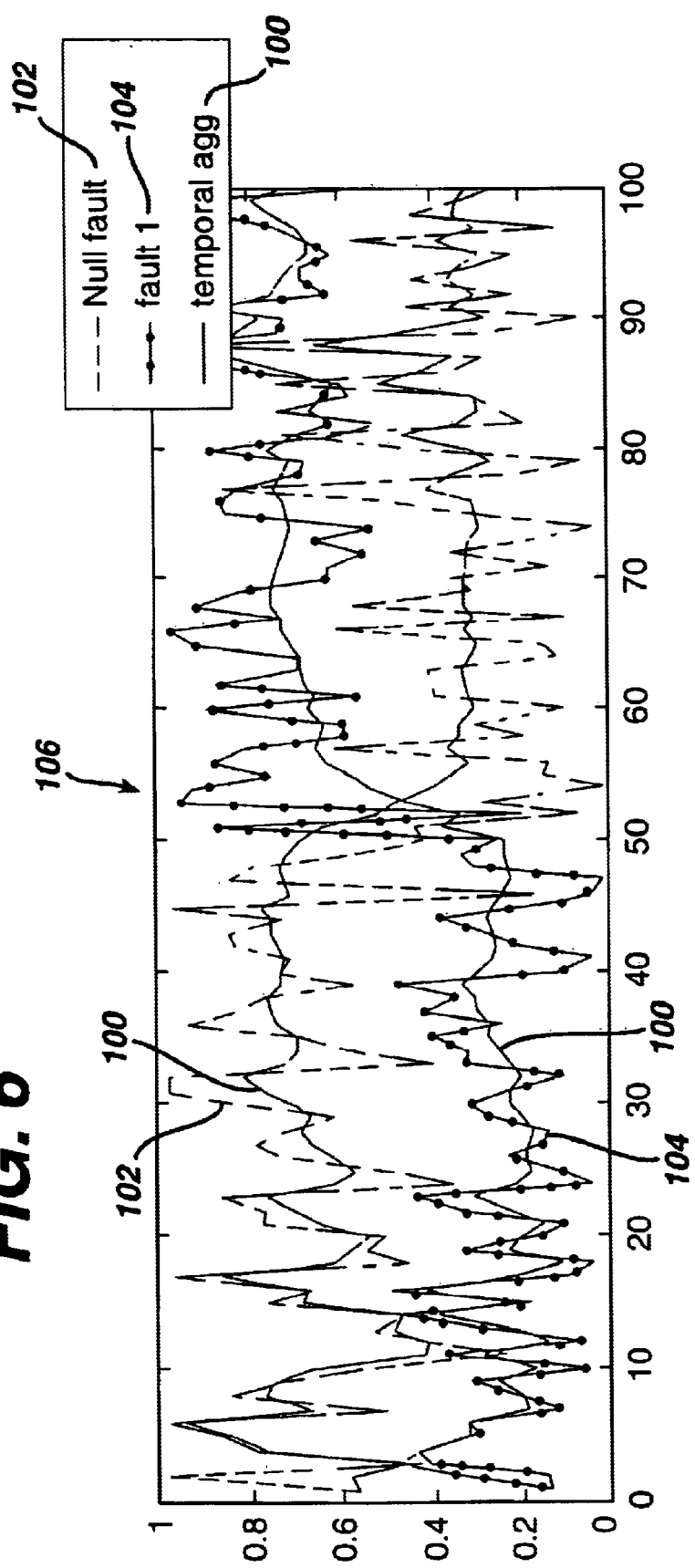
FIG. 6 is a exponential averaging graph in connection with temporal aggregation of information according to the present invention.
Figure 7:
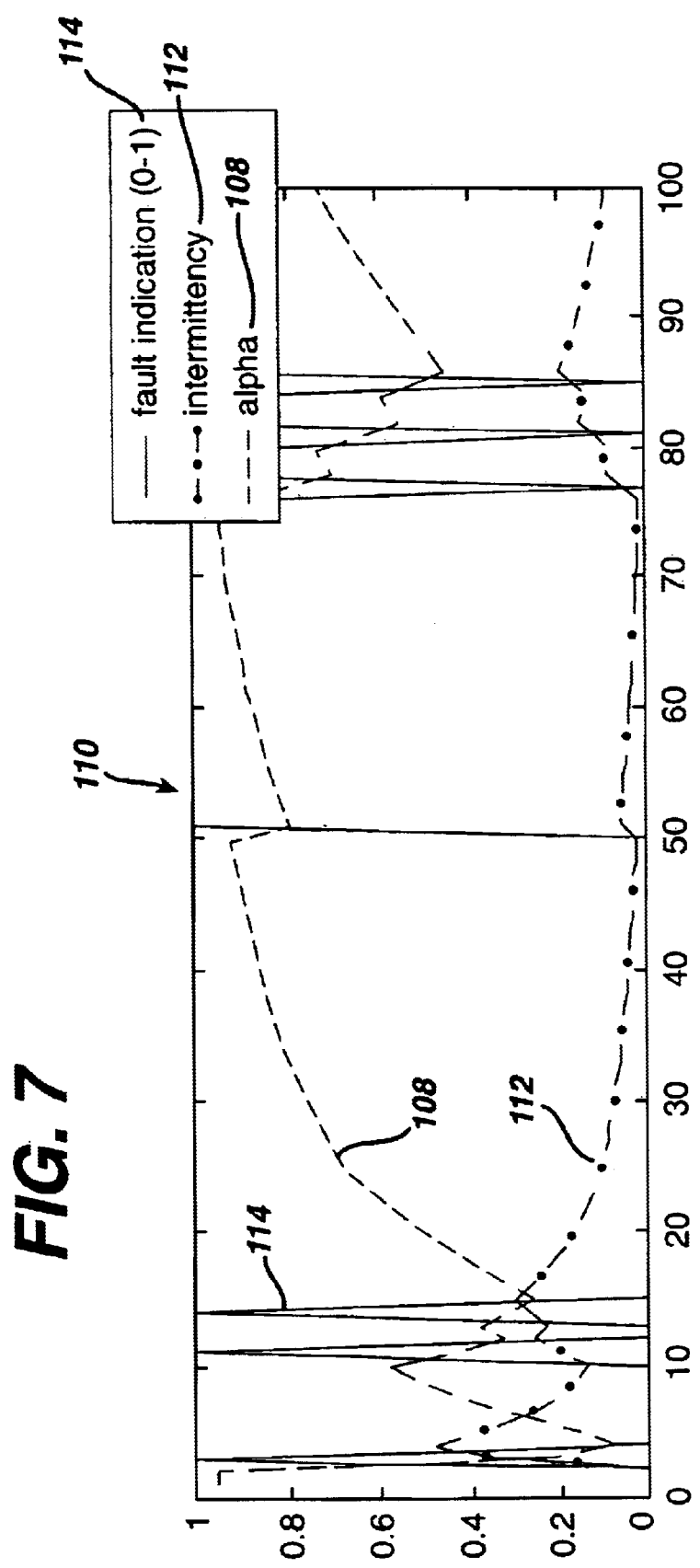
FIG. 7 illustrates the operation of the smoothing parameter according to the present invention.

Put together, an algorithm implementing the forgoing operations in concurrency layer 40 is as follows:

BEGIN
  IF there is a change in the status of a tool THEN
    Increase the change_count
  END IF
  IF change_count>0 THEN
    intermittency=change_count/window
  ENDIF
  alpha=max(lower_bound,min(upper_bound,(1−min(1,intermittency))^constriction_exponent))
  filtered_decision=filtered_decision*alpha+new_decision*(1−alpha)
  change_count=change_count*forgetting_factor
END Turning attention to FIG. 6 depicted is an exponential averaging graph representing operation of a fusion tool implementing the concepts of decision smoothing module 90, to obtain a temporal aggregation averaging 100, where two decision states, null fault 102, and fault1 104, were simulated, when a change of decision state 106 is detected. An underlying assumption is that decisions are scaled between 0 and 1 (y axis) and are interpreted as confidence or likelihood for a fault versus a time period (x axis). With attention to FIG. 7, the initial responsiveness of α 108, is noticeable, as well as a more sensitive value during the change of fault states 110. The smoothing parameter mirrors the behavior of the intermittency graph 112. Also shown in FIG. 7 is the fault indicator 114 which is the classification result. As can be seen, individual classification tools have a number of misclassifications if the likelihood of 0.5 is used as a classification threshold or when the "maximum wins" strategy is used. However, the smoothed values have a greatly reduced misclassification with only 2 misclassified decisions close to the crossover point 112 where the fault state changes 110. Clearly visible in FIG. 7 is how the averaging weeds out noise and outliers and responds quickly to the change of a fault state.

The foregoing discussion has disclosed a mechanism to reduce variations in decisions during decision agreement and how decision smoothing is automatically turned off when decisions disagree. Now presented is a mechanism to deal with the disagreement where one tool makes a decision $d_1$ (such as "system state is class 1") about a system state at time $t_1$ and another tool comes to a different conclusion $d_2$ (such as "system state is class 2") at a later time $t_2$. The present invention provides a manner to account for the fact that $d_2$ may have occurred between $t_1$ and $t_2$. This is generally accomplished by giving the later decision more weight in case of decision disagreement, to account for the possibility of event $d_2$. How much more weight $d_2$ (or how much less weight $d_1$) should have, is determined by discounting weight $d_1$ as a function of time passing between $d_1$ at time $t_1$ and $d_2$ at time $t_2$, through implementation of decision fading module 44. The reason such discounting is used is that there is a higher possibility for event $d_2$ to occur when the period $t_2-t_1$ is larger and vice versa. In addition, information about classification tools' a priori performance is known. The decisions are scaled between 0 to 1, and the forgetting factor is altered as the confidence value increases.

Figure 8:
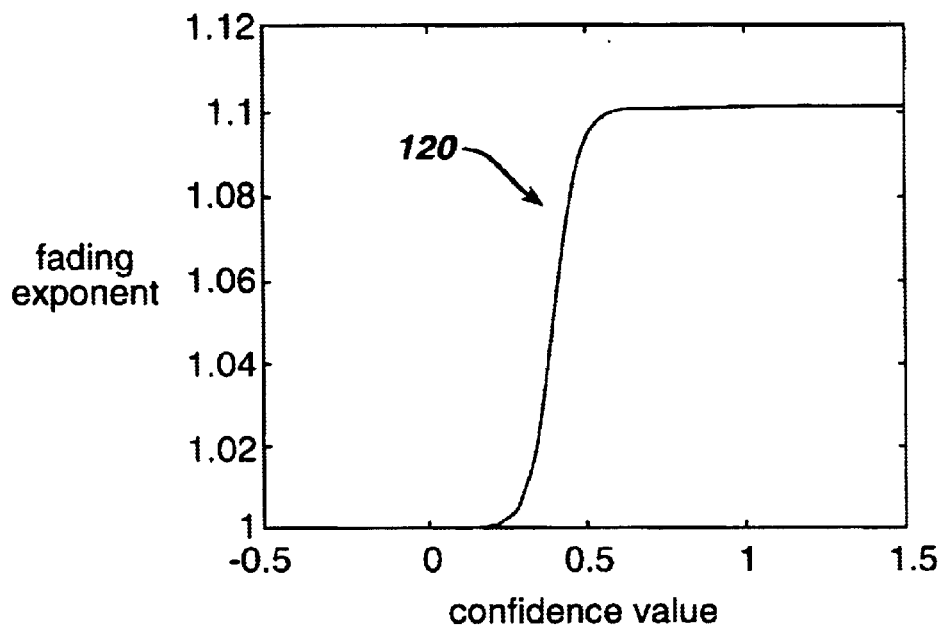
FIG. 8 illustrates the forgetting factor as a function of confidence.

FIG. 8 shows a representation of a forgetting factor as a function of confidence 120. The forgetting factor is close to 1 (y axis) for low confidence in the classification tool (i.e., 0 to 0.5 of x axis) and rises to 1.1 as confidence in the classification tool increases (i.e., 0.5 to 1 of x axis). The particular slope and upper saturation are system dependent.

The idea of decision fading is to discount information as it ages when tools disagree at different times (and no new update of both tools can be obtained). The older information is forced to "fade" as a function of time passed. If the conditions outlined are met, the decision is subjected to a forgetting exponent, tuned to the system under consideration.

Figure 9:
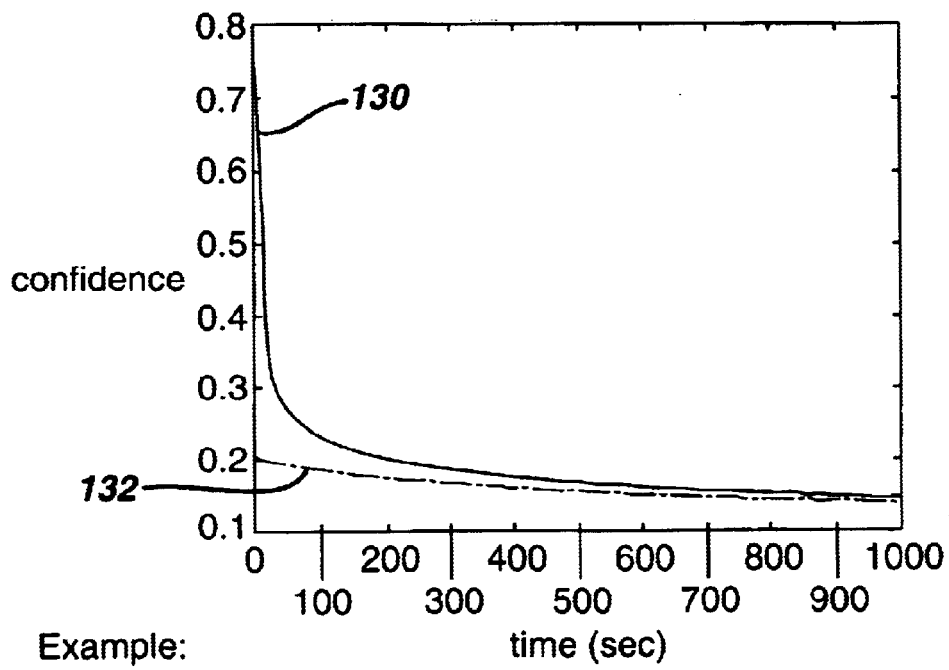
FIG. 9 depicts information of faults at two different confidence levels being discounted over time.

A decision fading algorithm which may be implemented by decision fading module 44 is as follows:

BEGIN
   IF decisions of tools not coherent AND time since last
     information sampling not the same THEN
     FOR EACH instance of the time difference
       new_decision=old_decision^fading_exponent
       old_decision=new_decision
     END FOR LOOP
   ENDIF
END FIG. 9 illustrates how the information of faults at two different confidence levels (confidence$_{upper}$=0.8, 130, and confidence$_{lower}$(1)=0.2), 132 are discounted over time (x axis). The fault, information with a 0.8 level confidence is discounted over a short time period, with a much steeper discounting slope, as compared to the fault information with a low 0.2 confidence level.

It is to be understood, that operation of decision smoothing module 96 and decision fading module 44, may function together or independently of each other.

Returning to the hierarchical architecture of fusion tool 22 of FIG. 2, more detail of the individual main layers will now be discussed. Association layer 46 takes advantage of the fact that valuable information may be obtained, by knowing a preferred misclassification of a classification tool. That is, if it is known beforehand that a tool B misclassifies class 1 as often as class 2, then it appears prudent to integrate that information into the reasoning process if class 1 is indicated by tool A and class 2 is observed by tool B. The misclassification is contained as the asymmetric entries of the confusion matrix of Table 1. This relation is utilized in association layer 46, by correlating the output of the classification tool according to the known preferred misclassifications. The correlation is performed by pre-multiplying the output of the classification tool with the negative inverse of the reliability matrix with a minimum cutoff of zero to obtain an association matrix. The effect of this operation is that side-effects of cross-correlation are factored out before the first fused estimate is calculated.

The following example illustrates the foregoing discussion:

$$\text{reliability\_matrix} = \begin{bmatrix} .9 & .95 & .95 \\ .95 & .9 & .99 \\ .9 & .5 & .4 \end{bmatrix}$$

$$\text{association\_matrix} = \begin{bmatrix} 1 & -0.05 & -0.05 \\ -0.95 & 1 & 0 \\ -0.1 & -0.5 & 1 \end{bmatrix}$$

input=[0.3 0.7 0.4]
input_mod=[0.225 0.485 0.385]

These concepts may, in turn, be described in the following pseudo-code:

BEGIN
   IF reliability>association_threshold THEN
     association_matrix=-(1-reliability)
   ENDIF
   FOR j=1 to number of classes
     Association_matrix(j,j)=1
   END FOR LOOP
   input=max(association_matrix*input,0)
END Turning now to scaling layer 50, this portion of fusion tool 22 implements functionality, via reliability norming module 52 and relevance scaling module 54, allowing a classification tool that is more reliable for a particular fault to be weighted more heavily than a classification tool with a worse track record for that same fault. The present invention places a higher trust in a more reliable classification tool, even when a less reliable classification tool indicates a strong confidence in its own opinion. However, even the more reliable classification tool fails occasionally, and when the less reliable tool happens to be correct, it would be a mistake to always use the more reliable tool's classification output exclusively. Then again, it is not known when a particular classification tool is correct and when it is not. Therefore, each tool's information is scaled by the degree of its reliability. This reliability is encoded as a priori information in the reliability matrix. More specifically, it is the diagonal entries of the reliability matrix which are used to weigh each classification tool output. In cases where there are considerably less classification tools for a class than for other classes and the reliabilities for this class are small, there is a chance that the output is biased to the other classes.

Therefore, the former cases are boosted to allow a more balanced comparison. The test for that scenario is whether the sum of the reliabilities for a class (given they are relevant) is less than a threshold multiplied by the relevances. The boosting operation scales the pertinent reliability values to the power of the sum of the reliabilities for that fault normed by the relevances. An algorithm to accomplish the foregoing is set out below:

```
BEGIN
    FOR each fault
        IF sum(trace(confusion_matrix)*relevance)<sum
            (relevance)*threshold THEN
            reliability=reliability*trace(confusion_matrix)^
                (sum(trace(confusion_matrix))/su
                m(relevance))
        ENDIF
        input=input.*(reliability(fault).^4);
    END for loop
END
```

Turning to strengthening layer 56 of FIG. 2, class opinions expressed by different classification tools, which all agree, will lead to a more confident assessment of the system state. This is the trivial case, where coinciding opinions are rewarded. The rewarding scheme is accomplished through the use of reinforcement module 58, by calculating the fused value as the sum of the classification tools outputs that are in agreement. Recall that the classification is a value expressing a likelihood for that particular class. That is, it is typically a weighted value. An algorithm accomplishing the discussed operation is set out below:

```
BEGIN
    FOR all faults
        FOR all tools
            IF input<strengthening threshold fused_value=
                fused_value+input
            END IF
        END for all tools
    END for all faults
END
```

Next to be discussed is weakening layer 60 of FIG. 2 which performs part of conflict resolution in cases where tools disagree on the classification state of the system. This is performed—in contrast to the strengthening layer—by discounting entries, via few tools discount module 62 and many tools discount module 64. Discounting was chosen because conflicting information lowers the conviction in a correct outcome. Therefore the fused value for the conflicting class(es) will be decreased. Similarly, if several faults are indicated at the same time, their contribution will also be discounted (for systems with a one-fault assumption) as a multi-fault discount. The following algorithm implements the operation described in connection with weakening layer 60:

```
BEGIN
    FOR all faults
        IF sum (input)<sum(relevance)/2 THEN
            fused value=fused_value*fewtools_discount
        END if
        IF more than one input has a confidence>0.5
            fused_value=fused_value*manyfaults_
                discount
        END if
    END for
END
```

With attention to evidence updating layer 66, it is known that besides primary class state information (such as diagnostic information), many systems are rich with secondary evidential information 24, which, in conjunction with the primary diagnostic findings, help confirm the diagnostic findings. However, the secondary evidential information is not diagnostic in nature, and no action will be taken based on this secondary evidential information alone. The present invention implements this strategy by using secondary evidential information 24 only to support a diagnostic opinion, through evidential reinforcement module 68. If the secondary evidential information is found not to corroborate the diagnostic finding, it does not need to be used to discount the diagnostic finding. Take, as an example, the thermal history of a compressor. A compressor fault might make more sense in light of information indicating a large number of cycles on the compressor. However, few cycles per se do not discount a compressor fault indicated by the diagnostic tools.

Similar to the relevance matrix, the present invention uses an evidence matrix that relates evidence to faults. In particular, in the presence of n evidence items, the matrix of Table 3 is formed where f is the number of classes (or, as in this example, faults) considered. This matrix has a "0" entry where no relevance is possible and a "1" where relevance exists. An evidence item may have relevance for more than one class, whereas a relevance item may not have less than one relevance entry. This evidence matrix provides a convenient way to map evidence to classes. The evidence matrix is then post multiplied by the evidence input. The evidence input is a 1×n vector containing the current evidence scaled between zero and one, depending on the strength of the evidence. The scaling is not necessary and can be omitted where strength of evidence information is not available.

To realize the boosting character of the evidence, a fused intermediate value is increased by the entries of the evidence matrix (i.e., a booster exponent) and the evidence input, scaled by a scaling factor, keeping the effect of the evidence within defined bounds. In one embodiment 5%–10% is a usable range for the system of the present embodiment. However, other values may be chosen, depending on the specific application. It was determined that the secondary evidential information 24 may not in some implementations play a major role in the output of the fusion tool, while it may in others.

One example of the foregoing is illustrated by the following pseudocode:

```
BEGIN
    fused_value=fused_value*(1+evidence_
        input*evidence_matrix*scaling_constant)
END
```

TABLE 3

| | evidence matrix | | | |
|---|---|---|---|---|
| | $e_1$ | $e_2$ | $e_3$ | $e_4$ |
| $f_0$ | 0 | 0 | 0 | 0 |
| $f_1$ | 0 | 0 | 0 | 0 |
| $f_2$ | 0 | 0 | 0 | 0 |
| $f_3$ | 0 | 0 | 0 | 0 |

TABLE 3-continued evidence matrix

|   | $e_1$ | $e_2$ | $e_3$ | $e_4$ |
|---|---|---|---|---|
| $f_4$ | 0 | 0 | 0 | 0 |
| $f_5$ | 0 | 1 | 1 | 0 |
| $f_6$ | 1 | 0 | 0 | 1 |

Turning to tie-breaking layer 70, this layer addresses a situation where several values of the fused class vector are declared almost equally likely. In this situation, a further refinement can be performed by discounting the less critical fault and/or by discounting the less frequent fault. For that purpose, a ranking of the classes and associated criticality and frequency of occurrence, is made available. Criticality is defined as the impact that a particular class has on system operation. Criticality is scaled between 0 (no impact) and 1. Not all systems may need to utilize that kind of information and therefore this process can be omitted, although in a diagnostic context where a class corresponds to a fault this process may be valuable.

Frequency is defined per system run. The information for both modules is encoded in criticality module 72 and frequency module 74 based on the information found in the criticality and frequency matrices as shown in Table 4 and Table 5, respectively.

TABLE 4

Fault criticality matrix

|   | $f_0$ | $f_1$ | $f_2$ | $f_3$ | $f_4$ | $f_5$ | $f_6$ |
|---|---|---|---|---|---|---|---|
| ranking | 7 | 1 | 2 | 3 | 4 | 5 | 6 |
| criticality | 0.01 | 0.9 | 0.8 | 0.8 | 0.8 | 0.1 | 0.1 |

TABLE 5

Fault frequency matrix

|   | $f_0$ | $f_1$ | $f_2$ | $f_3$ | $f_4$ | $f_5$ | $f_6$ |
|---|---|---|---|---|---|---|---|
| ranking | 1 | 7 | 6 | 5 | 4 | 3 | 2 |
| frequency | 0.999 | $10^{-5}$ | $10^{-6}$ | $10^{-5}$ | $10^{-5}$ | $10^{-4}$ | $10^{-4}$ |

The following algorithm checks for closeness of the results and then modifies the values in question using a dilation operation (similar to one used in fuzzy logic). The exponent used in the dilation function is a function of the criticality and frequency and is calculated as the inverse of the criticality faults to the power of 0.1. This procedure may be implemented in a fashion as illustrated in the following pseudocode:

```
BEGIN
    max_value=find(max(fused_value)==fused_value);
    tie_member_index=find the index of all values which
        are within a close range to the max value
    IF there are more than one members in the index list
    THEN
        Compute the criticality exponent and frequency
            exponents:
        criticality_exponent=(1−crit_faults).^0.1;
        frequency_exponent=sqrt(1./(1+exp(−(1./(freq_
            faults.^contraction_exponent))))));
        fused_value(tie_member_index)=fused_value
            (tie_member_index).
            ^crit_exponent(tie_member_index);
        fused_value(tie_member_index)=fused_value
            (tie_member_index).
            ^freq_exponent(tie_member_index);
    END IF
END
```

With attention to backscaling layer 76 and module 78, the classification tool outputs, which may at this stage be considered an intermediate fused value, has now undergone several rounds of modifications which leaves it—while internally coherent—in a state which may not be easily interpretable by a user. To that end, a sequence of backscaling steps is employed. First, the output for each class is scaled by the number of tools for that class. This increases the relative weight of classes for which there are only few classifiers. This is necessary because those cases are undervalued in the strengthening and weakening layers. Next, the fused value undergoes a dilating operation which increases larger values while reducing smaller ones. This is accomplished by a power operation. The result will be transformed into the 0–1 domain where the interpretation is that the higher the value, the more likely the fault.

The following pseudocode shows one potential implementation of the above concepts:

```
BEGIN
    fused_value=fused_value/sum(relevance)sum of rel-
        evances of the fused_value=fused_value^dilating_
        exponent
END
```

The principles of information fusion as described above have been applied to a diagnostic information fusion task for an aircraft gas turbine engine. The main goal of this operation is to provide in-flight health monitoring capability for gas path faults. Current diagnostic and condition monitoring systems generate classification information that are generally unambiguous in their specific intended application. However, they are less accurate as more fault coverage is demanded from a diagnostic tool, and are less definite as new diagnostic tools are added to either enhance capability or address new faults. This situation can lead to ambiguity in troubleshooting, maintenance personnel making uninformed decisions, erroneous component removals, and high operating costs. Thus, the overall goal of the information fusion process is to combine the relevant diagnostic and other on-board information to produce a fault diagnosis estimate to mitigate each of the aforementioned problems, to achieve a more accurate and reliable diagnosis than could be obtained using any individual diagnostic tool.

Key system components considered for this health monitoring scheme are the fan, the high pressure compressor, the high and low pressure turbines, and bearings. Thermocouples, pressure and flow sensors as well as wireless micro electro-mechanical systems (MEMS) measure and process data from the components. The fusion tool (which may hereafter also be called an information fusion module (IFM)) used in the project demonstrates dual use capability by being designed, and tested on both a commercial and a military aircraft engine. The gas path faults considered are:

1. Fan fault (Fan)—Fan blade damage, typically occurring due to bird strikes or other Foreign Object Damage (FOD) during takeoff.
2. Compressor (Comp) fault—Compressor blade damage or abnormal operation
3. High Pressure Turbine (HPT) fault—Typically a partial loss of one or more blades, most commonly during high power conditions.

4. Low Pressure Turbine (LPT) fault—Typically a partial loss of one or more blades, most commonly during high power conditions. LPT blade faults are less frequent than HIT blade faults.
5. Customer Discharge Pressure (CDP) fault—Leakage in excess of the desired bleed level commanded by the aircraft and communicated to the Full Authority Digital Electronic Control (FADEC). FADEC does not have control over the CDP valve. The CDP valve takes air off the HP compressor for use in various aircraft functions such as air-conditioning, cabin pressurization, and anti-icing.
6. Variable Bleed Valve (VBV) fault—VBV doors not closing according to FADEC issued command, or one or more doors get stuck in a particular position. VBVs are intended to prevent low pressure compressor stalls.
7. Combustor Leak (Leak) fault_Holes burnt in liner and hot gas leaks into the bypass duct.
8. Variable Stator Vanes (VSV) fault—Manual errors in installation resulting in small misalignments in vane angles. The VSVs control the amount of air that goes through the high pressure compressor.
9. Inlet Guide Vane (IGV) fault—Manual errors in installation resulting in small misalignments in vane angles. The IGVs control the amount of air that goes into the fan.

The combustor leak, VSV, and IGV faults are applicable to the military engine, while the CDP leak and VBV faults are applicable to the commercial engine only; otherwise, the faults are applicable to both engines.

Primary diagnostic input was provided by several classification (diagnostic) tools. The parameters of the diagnostic tools as well as their structure being different for the two engine types. The tools used were:

1. Overall Delta (D1)
    D1 is an approach which compares pre-flight with post-flight conditions to arrive at a system estimate.
2. Delta-Delta (D2)
    D2 is an approach which compares sensor measurements with modeled values. Deviations ("deltas") are indicative of faults. The comparison is referenced to pre-flight deltas to remove residual deltas.
3. Neural Net (NN)
    NN is a pattern recognition approach that takes engine measurements as inputs, evaluates them as patterns and—if found suspicious—renders a fault message. It is an absolute approach that allows the detection of a priori faults that may crop up, for example, due to incorrect maintenance. The other two approaches (D1 and D2) cannot deal with a priori faults. In addition, the NN approach can be used during take off, where the other techniques do not operate.

It is to be appreciated that classification (diagnostic) tools other than D1, D2 and NN may be used in connection with the present invention, as well as the present embodiment, and that the design of tools usable with the present invention would be readily apparent to one of ordinary skill in the art.

Other system information (i.e. secondary evidential information) not diagnostic in nature can be used to support a diagnostic opinion as inputs to the information fusion tool. In particular, the following information was used:

1. Model Based Engine Deterioration Estimator (MBT)
2. Vibration Analysis (VIBE)
3. FADEC Fault Codes (FFC)
4. Intermittent Fault Code Tracking (IFCT)
5. Flight Phase Switch (FPS)
6. Thermal History (TH)

Figure 10:
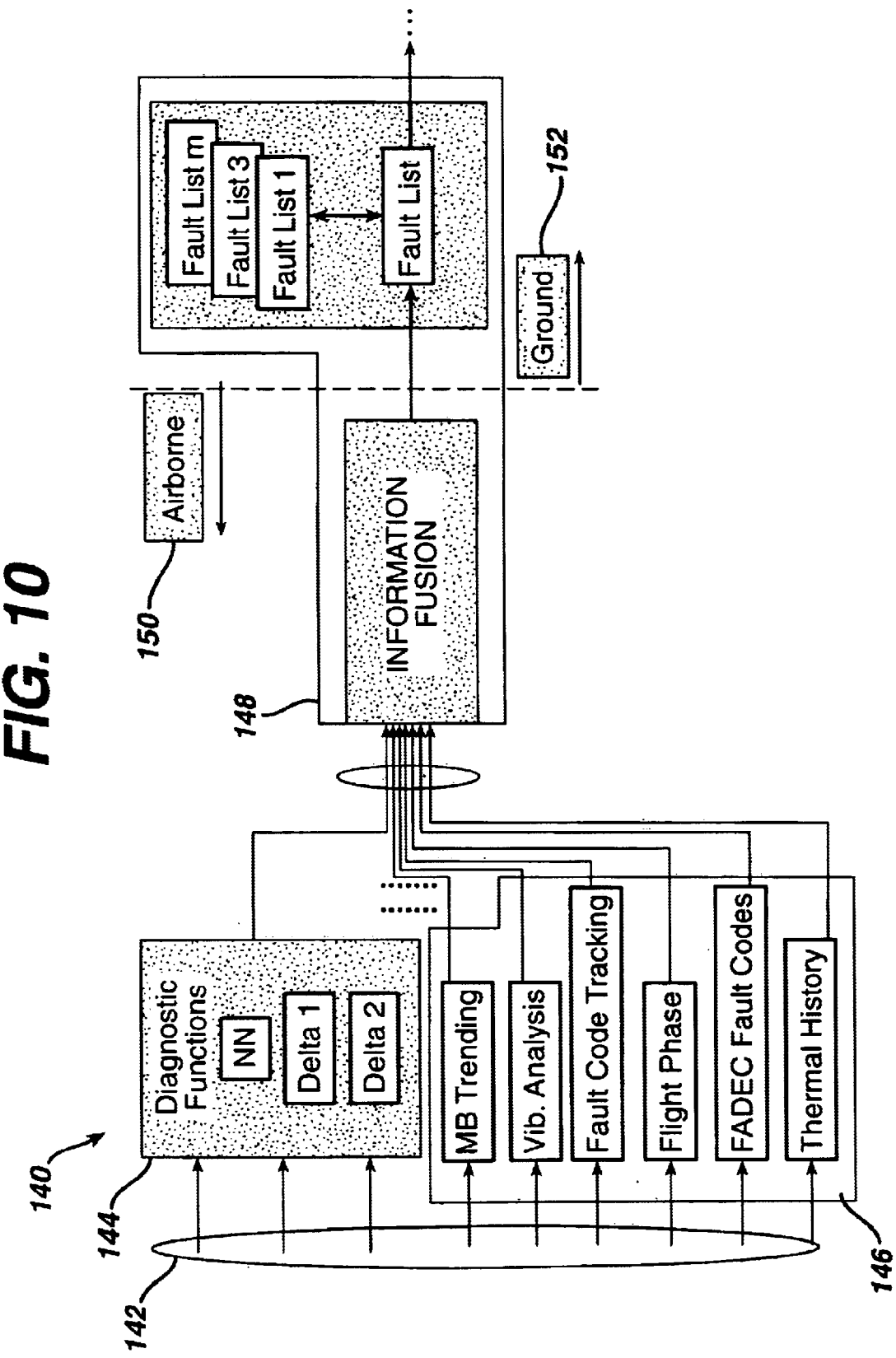
FIG. 10 is an overall block diagram of an information fusion implementation according to the present invention.

Turning to FIG. 10, illustrated is a general block diagram 140 of the present embodiment. Raw engine measurements are provided to the system via an input bus 142 which may be a 1553 bus, an ARINC bus, or other appropriate data transmission medium. Relevant information is sent to the appropriate classification (diagnostic) tool such as those depicted in diagnostic functions block 144, and to the appropriate secondary evidence block 146. Outputs from the tools in diagnostic and evidencing blocks 144, 146 are provided to information fusion tool 148 as lists of fault I.D.'s and performance detection. In the information fusion tool shown by block 148, multiple fault lists are aggregated into a single list. This aggregation of fault lists addresses issues such as partial overlap of output information, missing information, conflicting information, different performance levels of the tools inputting the information, and the timeliness of the diagnostic data. As can be seen, by FIG. 10, portions of the fusion tool operation will occur while the aircraft powered by the engines under observation are airborne 150. While other actions are taken when the engines are on the ground 152. The operations taking place while on the ground, provide further refinement of outputs comparing fused fault lists to historic and confirmed list in order to obtain a final fused output.

It is to be appreciated that the secondary evidential information (i.e., MBT, VIBE, FFC, IFCT, FPS, TH) are existing or known types of information recorded regarding system operations including those for gas turbine engines. For example, the model-based engine deterioration estimator (MBT) is an existing piece of software which monitors operation of an engine and makes predictive statements as to the expected lifetime of the engine's operation. A vibration analysis (VIBE) detects the amount of vibration within an engine to determine damage which may be caused by the existence of excessive vibration. FADEC fault codes (FFC) are standardized codes which are known in the industry to represent states of a system. Intermittent fault code tracking FCT (IFCT) is a mechanism to track the existence of FADEC fault codes during the operation of a specific system. A flight phase switch FPS (FPS) is a detector of the different phases of operation of an engine during flight, and a thermal history (TH) measures and records the temperatures reached during operation of an engine.

Figure 11:
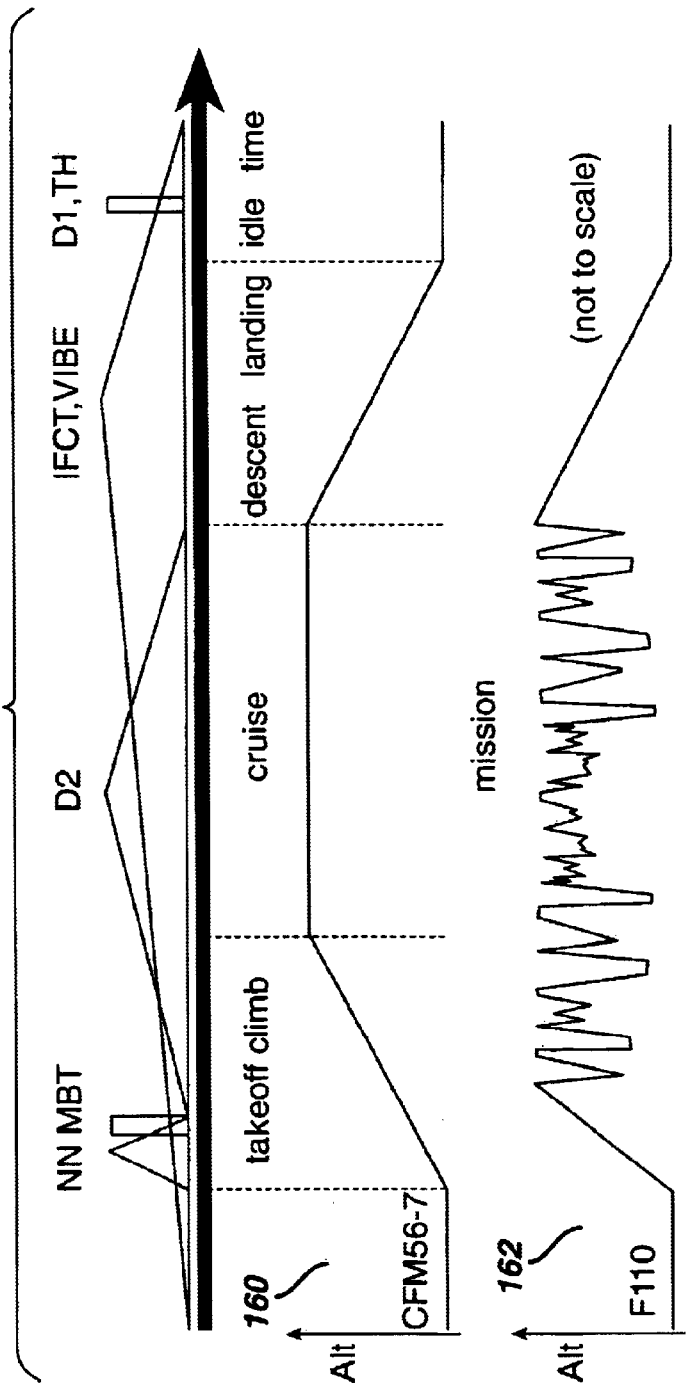
FIG. 11 depicts a fusion architecture and timeline for diagnostic and evidentiary tools.

Turning to FIG. 11, depicted are typical abstracted flight profiles of the commercial engine 160 and the military engine 162. Flight profile 160 illustrates that the commercial engine accelerates through take-off and climb stages until reaching a cruise altitude at which it is maintained until moving to a descent and landing. For the military engine, it may be noticed that there are many variations in its altitude producing a somewhat erratic profile during the climb and cruising stages. Its descent also is shown in a manner similar to the profile 160. The erratic nature of profile 162 represents changes in altitude, whereas profile 160 illustrates operation of the engine with less altitude changes. FIG. 11 also depicts when classification tools and/or secondary evidential tools are active throughout operation of the engines. Specifically the neural network (NN) is active during the take-off and climb stage only. Similarly, the model-based engine deterioration estimator (MBT) is also only active during this early time period. The Delta 2 (D2) classification tool extends its observations from the take-off climb through the cruising portion of the operation up to the beginning of the descent. The intermittent fault code tracking (IFCT) which uses the FADAC code faults (FFC) is active throughout the entire operation. The vibration analysis (VIBE) also functions during this relevant time period. The Delta 1 (D1) and thermal history (TH) tools function after the engines have performed the flight operation and are idle. It is understood that the foregoing profiles and operations are not to scale. The flight phase (FPS) tool coverage is not shown in this figure.

The foregoing feature of FIG. 11 confirms that not all the classification (diagnostic) tools or the secondary evidential tools are in operation at the same time during the system's operation. Thus FIG. 11 again emphasizes the need of fusion tool 148 to address those situations where time disparities between fault detections exist.

Turning to Table 6, set forth are the performance gains of individual layers of the fusion tool implemented in the present embodiment when tested alone. An incremental software development plan was used which ensured that each step contributed to a performance gain. To that end, each layer was tested and tuned before proceeding to the next development step.

To evaluate classification tool performance, a maximum wins strategy on transformed and normalized inputs scaled by the a priori reliability of the classification tool is performed by an appropriate benchmarking algorithm. For the performance evaluation, aggregated information may be estimated if the time requirements to perform a full system temporal aggregation simulation or to obtain actual data would require an unacceptable time period. Alternatively, actual or simulated aggregation information may be used if the time period to obtain this information is reasonable. An overall performance index (PI) is created by weighing the individual components FP, FN, and FC:

$$PI=0.6*(1-FP)+0.3*(1-FN)+0.1*(1-FC) \quad \text{Eq. 5}$$

For use as an initial benchmark the performance index is set to zero. Thereafter, an increase in performance is measured as the fraction of improvement from that baseline to perfect performance, expressed as a percentage.

TABLE 6

Performance gain of individual layers (alone)

| Layer | Performance gain | Comments |
|---|---|---|
| 0 | 10% | |
| 1 | 9% | |
| 2 | 6% | |
| 3 | 39% | |
| 4 | 39% | |
| 5 | 1% | |
| 6 | N/A | |
| 7 | 0% | No performance gain intended |

It is understood the integrated performance of the layers is not completely additive. For one, each subsequent layer operates on an already improved system. In addition, there is some interdependence of the layers which can be explained with conflicting heuristics. The overall performance (established in 10,000 runs) leads to:

FP=0.01%

FN=0.20%

FC=0.20% with a performance index gain=94.71%:

Table 7 is a confusion matrix for fusion tool 148 in connection with the commercial engine. This confusion matrix is similar to the confusion matrix of Table 1. However, where Table 1 was for a single classification tool, Table 7 shows a confusion matrix for the information fusion module 148. Further, where Table 1 was included in raw numbers per testing, Table 7 has been generated in a decimal format. Also, the estimated classes are provided column-wise whereas the real classes are on the row, the opposite of Table 1. Nevertheless as can be seen, the information fusion module 148 will correctly identify a null existing fault to 0.9962 accuracy. Similarly, a fan fault is identified with 0.9986 accuracy. Therefore again, the diagonal entries represent the correctly classified states. A first column, except the first entry, contains the FP states, the first row, except the first entry, contains the FN states, and the off diagonal elements, except the FP and FN represent the FC states.

TABLE 7

Confusion Matrix for Information Fusion Module (IFM)

| est\real | Null | Fan | Comp | HPT | LPT | VBV | CDP |
|---|---|---|---|---|---|---|---|
| Null | 0.9962 | 0.0000 | 0.0002 | 0.0009 | 0.0003 | 0.0011 | 0.0013 |
| Fan | 0.0000 | 0.9986 | 0.0003 | 0.0000 | 0.0002 | 0.0004 | 0.0005 |
| Comp | 0.0036 | 0.0000 | 0.9873 | 0.0006 | 0.0008 | 0.0012 | 0.0065 |
| HPT | 0.0024 | 0.0001 | 0.0001 | 0.9864 | 0.0073 | 0.0028 | 0.0009 |
| LPT | 0.0088 | 0.0004 | 0.0004 | 0.0066 | 0.9797 | 0.0016 | 0.0025 |
| VBV | 0.0015 | 0.0000 | 0.0080 | 0.0087 | 0.0047 | 0.9638 | 0.0133 |
| CDP | 0.0048 | 0.0000 | 0.0010 | 0.0000 | 0.0003 | 0.0161 | 0.9778 |

Extensive simulations and instrument rig tests have been undertaken to validate the classification tools and fusion module. The overall classification task of the integrated main information fusion layers improved the results by approximately two orders of magnitude compared to any individual tool alone from an average of 10% misclassifications to 0.1% misclassifications.

Turning now to reliability of the fusion tool 148, it is known that the reliability of diagnostic tools may drop due to sensor degradation, faulty data acquisition, environmental disturbances (electromagnetic, . . . ), incorrect model correction, etc. These effects are expected to result in a performance drop. The degradation of performance was simulated by imposing an average performance drop on each diagnostic tool of 10% and 20%. It was observed that a drop of the fusion performance of only 2.46% and 3.20% for the two cases, respectively on the three measures of false positives, false negatives, and falsely classified classes. This indicates that the performance of the overall fused output is very robust against deterioration.

Figure 12:
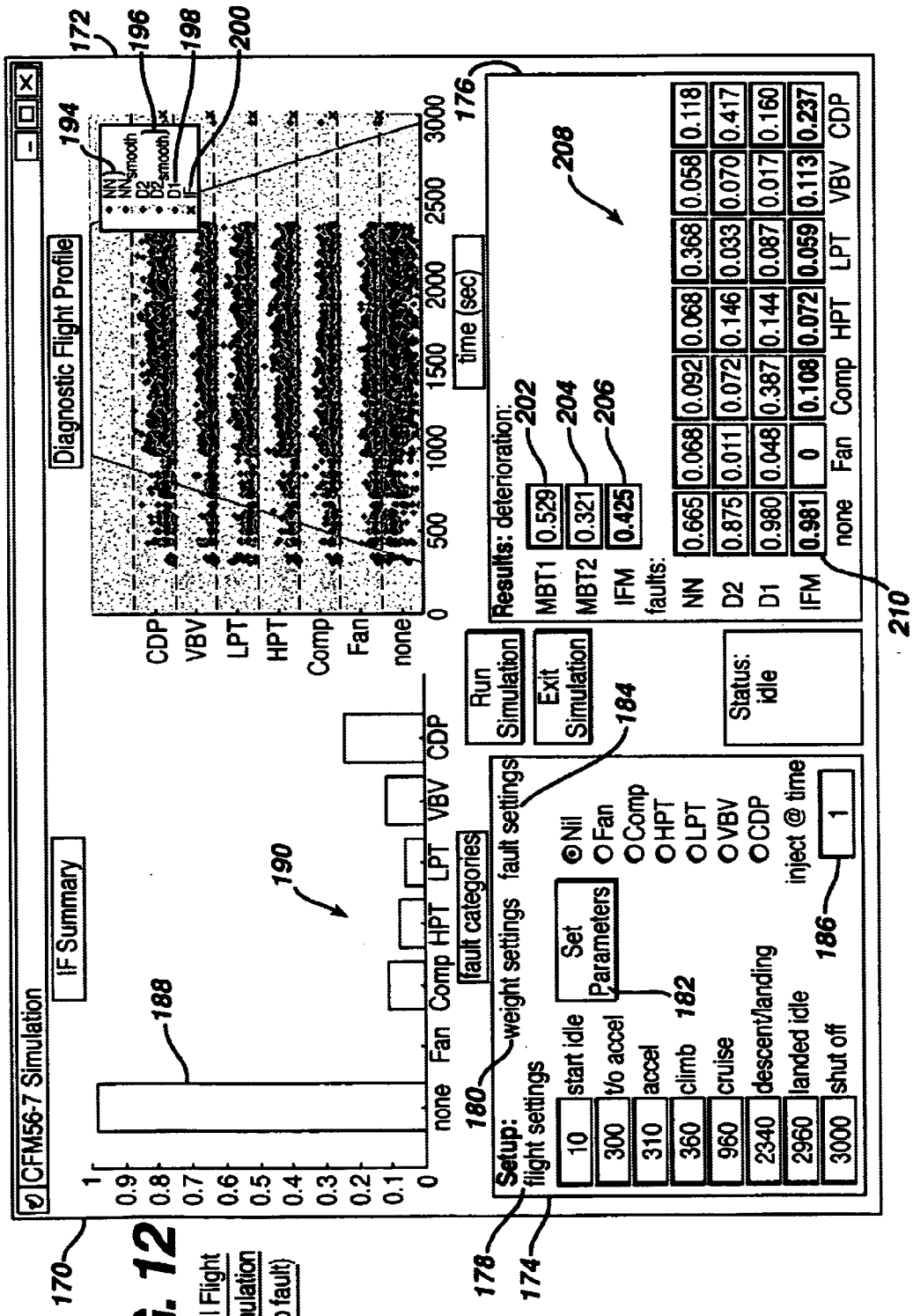
FIGS. 12–14 illustrate a graphical interface according to the present invention.
Figure 13:
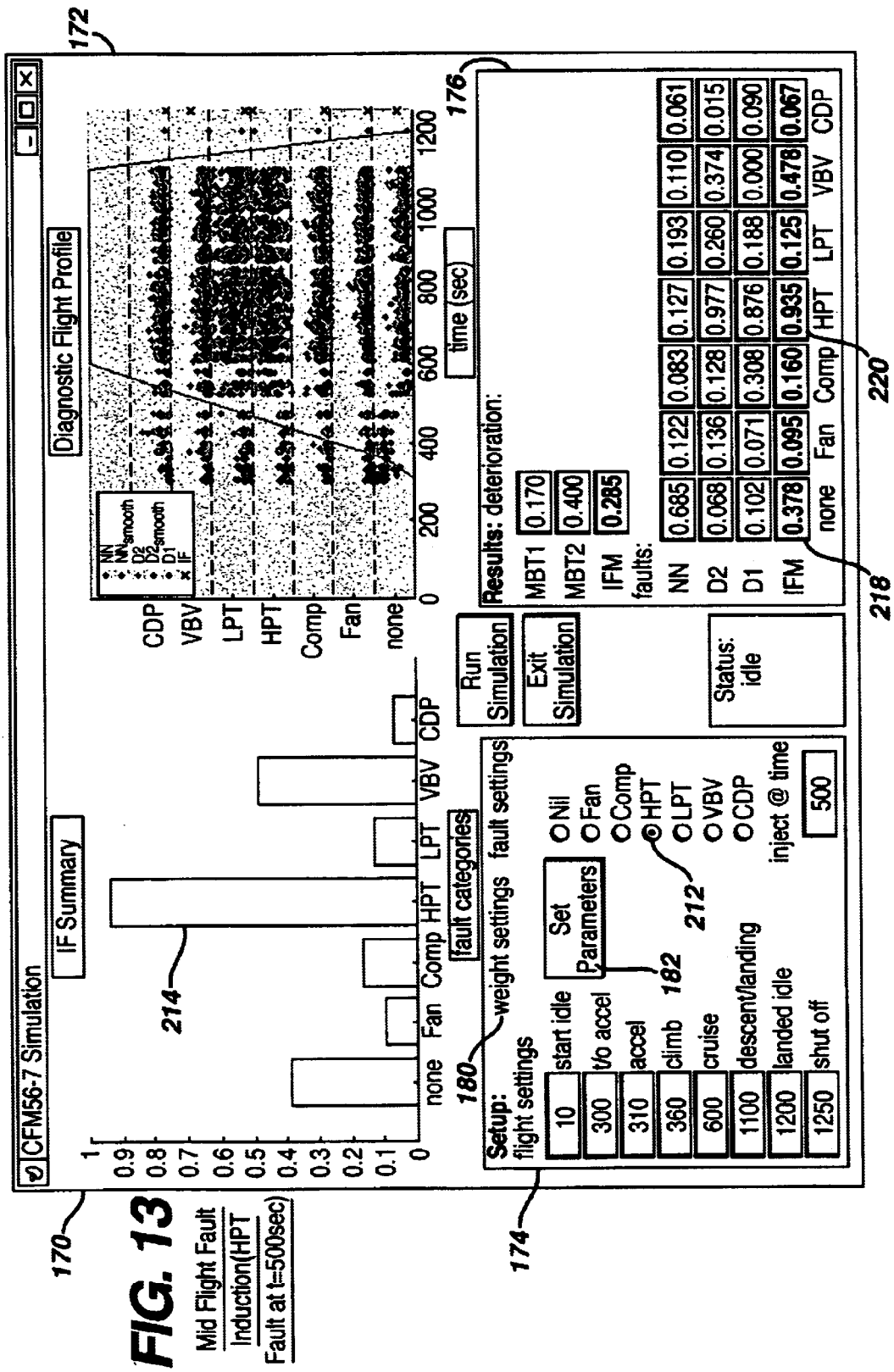
Figure 14:
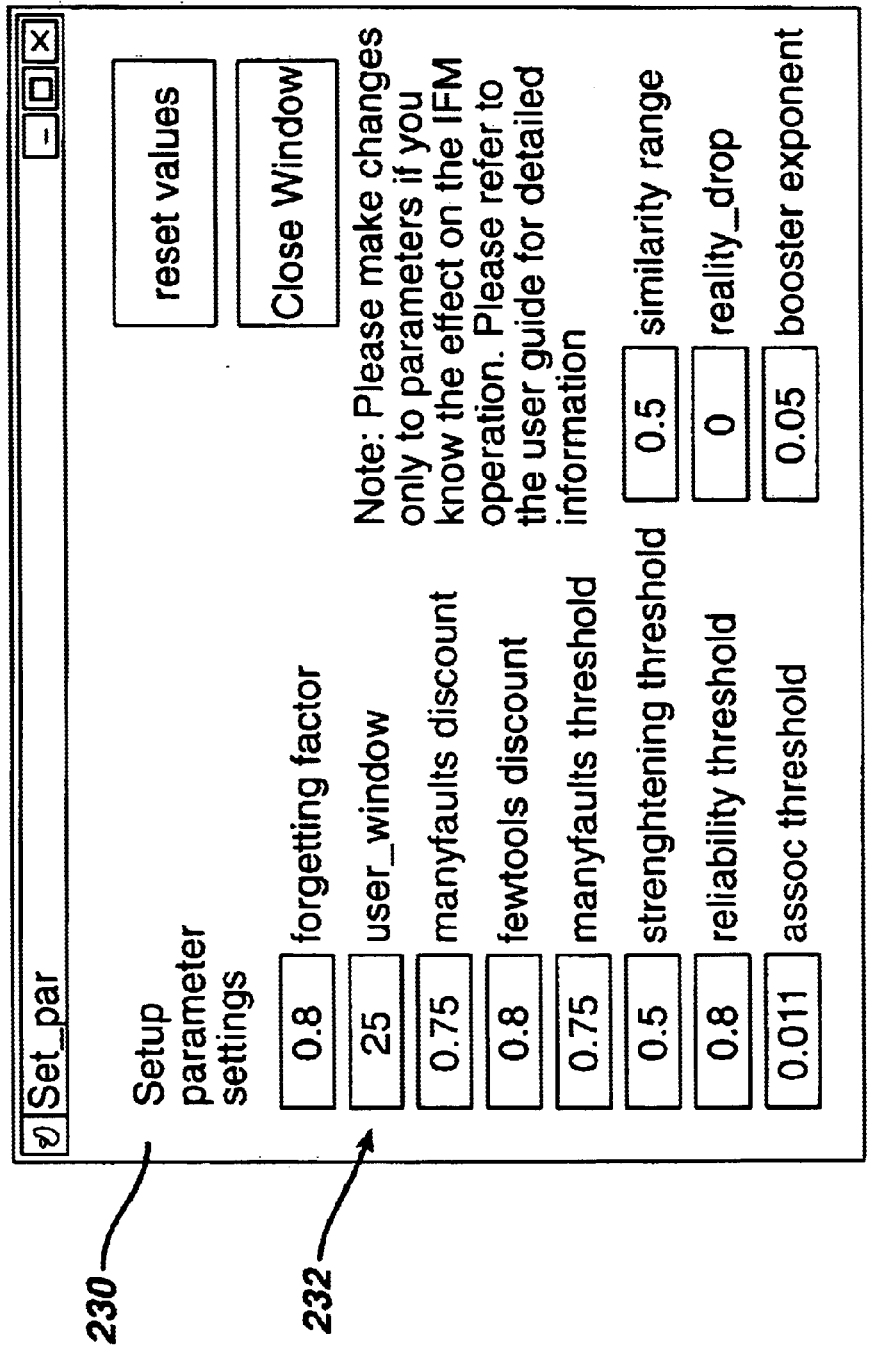

Turning to FIGS. 12–14, depicted is a graphical user interface allowing an end user to interact with a fusion tool according to the present invention. FIG. 12 is intended to represent a full-flight simulation of the CFM 56-7 engine without any faults injected into the flight. The graphical user interface includes four main blocks or tiles, including an information fusion summary block 170, a diagnostic flight profile block 172, a system set-up block 174, and a results block 176. These blocks may be displayed simultaneously or individually.

In system set-up block 174, the flight steps 178 and the times for each section of the flight are set. The different time periods of the flight include, start, idle, take-off acceleration, climb, cruise, descent/landing, landed idle and shut-off. A weight-setting section 180 allows for inputs by an operator using known or desired weighting values by selection of a set parameters block 182.

In this simulation a fault may be selected from one of the known faults which may occur in the system (i.e., Nil, Fan, Comp, HPT, LPT, VBV, CDP) 184. In this embodiment a Nil fault has been selected. Inject time block 186 allows a user to insert a time when a select fault is to be inserted.

Information fusion summary graph 170 illustrates that the information fusion tool generates an output indicating a very high likelihood of a fault status 188. The potential faults (i.e. Fan, Comp, etc.) 190 on the other hand are represented as having a low likelihood of occurrence.

Turning to the diagnostic flight profile, block 172, the x axis is a timeline of the engine operation from 0 to 3,000 seconds which is the shut-off at the engine shown in the flight setting 178 of block 174. The y axis lists the potential faults which may occur within the engine. An overlay 192 shows the flight path from 300 seconds which is the take-off acceleration to 3,000 seconds, corresponding to engine shut-off. The status for each of the listed potential faults, are graphed by various diagnostic tools (some with and others without the use of smoothing techniques) 194, 196, 198 including the output of the information fusion tool 200. The overall operation shown by the diagnostic flight profile is a substantially consistent representation for each of the potential faults indicating a no-fault situation.

Turning to results block 176, a first block 202 represents a first model-based engine deterioration estimator output (MBT 1), and second block 204 represents a second output (BMT 2). Also shown is deterioration factor of the information fusion tool 206.

Block 176 further provides a representation of the output of the diagnostic tools (NN, D2, D1) and the fusion tool for each of the potential faults (none, Fan, Comp, HPT, LPT, VBV, CDP) 208. Since a no-fault state exists, the fusion tool (IFM) 148 indicates a 0.981 likelihood that there is no fault 210. Results of the likelihood of existing faults for the remaining potential faults are also set out to allow viewing by a user. For example, fusion tool 148 also outputs a 0.108 likelihood that a "Comp" fault exists; a 0.113 likelihood a VBV fault exists; a 0.237 likelihood a CDP fault exists, etc.

Turning to FIG. 13, the same graphical user interface as disclosed in FIG. 12 is shown. However, in this view, a high-pressure turbine (HPT) fault 212 (block 174) is injected at 500 seconds into the operation of the engine. The existence of the HPT fault 212 (block 174) is clearly recognized by the information fusion tool 214 (block 170). Similarly, at approximately 500 seconds into operation, there is a clear break 216 in the pattern of the diagnostic flight profile output as shown in block 172. This is more clearly seen in comparison with FIG. 12.

Additionally, in block 176, the likelihood of a no-fault state (none) 218 has dropped dramatically (0.378), whereas the existence of an HPT fault 220 has risen to a 0.935 likelihood. The foregoing provides clear detail to a user of the system operation.

It is to be appreciated that while the present graphical user interface is shown being used in conjunction with a flight simulation, a similar graphical user interface may be used in connection with the actual testing. In this use, the fault settings 184 and injection time of the fault 186 shown in block 172 may simply be removed. Alternatively, settings 184 may be reconfigured to be a fault acknowledgement indicator whereby the fault which is most likely is highlighted. Further, the injection time block 186 may be configured into a fault indication time block which indicates at what time period the fault was first detected.

Returning to FIG. 13, in block 174 when set parameters button 182 under weight setting button 180 is selected, screen 230, of FIG. 14, is presented for the user. Screen 230 allows the user to input values 232 used by the information fusion tool, including values for a forgetting factor, user window, many faults discount threshold, similarity range, reality drop and booster exponent.

As can be understood from the foregoing description and FIGS. 12–14, the information fusion tool of the present invention may be implemented as a computer readable program stored on a computer useable medium. In this situation fusion tool 22 would be the computer readable program stored on a computer or other electronic device capable of reading and performing functions based on stored readable code.

The foregoing describes a system for fusion of outputs from classification tools, using a layered weight manipulation scheme. This approach is beneficial in situations with conflicting classification tool information, temporal information discord (where the estimate of different tools is considerably separated in time), differences in information updates (where the classifier is updated at different rates), class coverage discrepancies, and integration of a priori performance specifications, among other conflicts.

These techniques are viewed as applicable not only to diagnostic decision fusion, but are equally useful in connection with feature fusion or data fusion processing. Therefore, reference in this disclosure to an information fusion tool, should be read to mean such a tool that is useful for any one of decision fusion, feature fusion, data fusion processing. In this disclosure, the techniques were considered within a hierarchical framework. If a hierarchical model is not used, individual techniques can be used separately or in any combination for fusion tasks.

The concepts disclosed may be used in a different framework than presented here (for example in a fuzzy logic context). In addition, individual layer operation can be refined; for example, a discounting redundancy penalty could be implemented which penalizes directly correlated output.

It is to be further appreciated that a multitude of permutations and combinations of the described layers may be used to develop a working system with the scope of the present invention.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appending claims.

What is claimed is:

1. An computer implemented information fusion configuration used for generating an output state of a system, the information fusion configuration comprising:

a plurality of sensors associated with the system, each sensor related to at least one class of the system and sensing data related to the at least one class;

a plurality of classification tools each designed to receive selected outputs from the sensors, and to generate classification outputs representing a state of at least one class of the system; and an information fusion tool configured to receive the outputs of the classification tools as inputs, and having a hierarchical architecture which manipulates the inputs to generate an output of aggregated fused information for a particular class of the system and wherein the information fusion tool uses a priori information concerning the classification tools, wherein a source of the priori information is from at least one of confusion matrices developed for individual classification tools, a relevance matrix corresponding to the classification tools supplying information to the fusion tool and a reliability matrix corresponding to the classification tools supplying information to the fusion tool.

2. The invention according to claim 1 wherein the information fusion tool includes:

a scaling layer which provides a higher weight to the output of a first classification tool having a statistically greater reliability for a specified fault than the output of a second classification tool with a statistically lower reliability.

3. The invention according to claim 2, wherein the scaling layer includes encoded a priori information derived from the reliability matrix, such that information from each classification tool being used by the information fusion tool is scaled by a degree of reliability of the classification tool.

4. The invention according to claim 2, wherein the scaling layer is configured such that when the sum of the reliabilities for a relevant class is less than a predetermined threshold value, multiplied by the relevances of the classification tools, a boost operation is undertaken for the relevant classification tools.

5. The invention according to claim 1 wherein the information fusion tool includes:

a strengthening layer which generates an output by summation of classification tool outputs which are in agreement.

6. The invention according to claim 1 wherein the information fusion tool includes:

a weakening layer which performs conflict resolution processing between at least two of the plurality of classification tools which disagree on the classification state of the system.

7. The invention according to claim 6, wherein the weakening layer includes a discount module is designed such that when classification tools disagree on a classification state of the system, the output from the classification tools are discounted.

8. The invention according to claim 6, wherein when several faults are indicated at the same time, their contribution will be discounted, for systems with a one-fault assumption.

9. The invention according to claim 1 wherein the information fusion tool includes:

an association layer designed to correlate a classification tool output by known preferred misclassifications of the classification tool.

10. The invention according to claim 9, wherein the correlation in the association layer is obtained by a pre-multiplication of a classification tool output with an association matrix. The association matrix is calculated by subtracting one from the reliability matrix where off-diagonal elements below a threshold are set to zero and where the diagonal elements are all one. The result of the calculation has a minimum cutoff of zero.

11. The invention according to claim 1 wherein the information fusion tool includes:

an evidence updating layer which supplies secondary evidentiary information which supports the determined classification state of the system; and a tie-breaking layer designed to select between at least two equally likely classification states.

12. The invention according to claim 11, wherein, in the evidence updating layer, data from an evidence matrix is used to enforce the existence of a particular class.

13. The invention according to claim 11, wherein the tie-breaking layer includes a criticality module with information from a criticality matrix, and when several values of an intermediate fused class output are declared substantially equal, faults determined to be less critical are discounted by a predetermined value.

14. The invention according to claim 11, wherein the tie-breaking layer includes a frequency module with information from a frequency matrix, and when several values of a fused class output are declared substantially equal, faults determined to be less frequent are discounted by a predetermined value.

15. The invention according to claim 14, wherein a forgetting factor of the decision fading module is used to determine the weights applied to the later made decision and the earlier made decision.

16. The invention according to claim 1 wherein the information fusion tool includes:

a concurrency layer configured to aggregate the input information from the plurality of classification tools, and to perform an information fading operation when predefined temporal conditions exist.

17. The invention according to claim 16, wherein the concurrency layer includes a decision fading module which assigns higher weight values to a later made decision, than weight values assigned to an earlier made decision.

18. The invention according to claim 16, wherein the concurrency layer includes a decision smoothing module for use with individual classification tools, the decision smoothing module implemented via an exponential averaging time series filter with an adaptive smoothing parameter expressed as:

$$x(k) = \alpha x(k-1) + (1-\alpha) y(k)$$

where,
x(k) and x(k−1) are filtered decisions at times k and k−1,
α is a smoothing parameter, and
y(k) is a new incoming decision.

19. The invention according to claim 18, wherein the smoothing parameter is obtained by;

$$\alpha = (1-\text{intermittency})^{\text{constriction\_exponent}}$$

where,
constriction_exponent scales α and is a value>1, and α is bounded between a lower and upper value
intermittency is computed by dividing a counter keeping track of changing classification output by a user defined window.

20. The invention according to claim 18, wherein the decision smoothing module is turned off when decisions from the classification tools are in disagreement.

21. The invention according to claim 1 wherein the information fusion tool includes:
a backscaling layer which manipulates the output generated by the fusion tool into a standardized output value understandable by an end user.

22. The invention according to claim 21, wherein the backscaling layer includes a backscaling module provides a scaling factor to an intermediate output value of each class, the scaling factor being based on the number of classification tools for that class; and
wherein, a dilating operation is performed on the fused intermediate output.

23. The invention according to claim 1, wherein the information fusion tool is configured to address conflict resolution for cases,
where output of two or more classification tools disagree;
where outputs of different classification tools are generated at different times, separated from each other by more than a predetermined time period;
where classification tools are updated at different rates; and
where classification tools have varying class coverages.

24. The invention according to claim 1, wherein the classification tools are diagnostic tools, the information fusion tool is a diagnostic fusion tool, and the output of the fusion tool is a fused diagnostic output.

25. The invention according to claim 1, wherein the information fusion tool is designed to perform at least one of feature fusion, data fusion and decision fusion processings.

26. An computer implemented information fusion tool comprising:
a concurrency layer configured to aggregate input information from more than a single classification tool, and to perform an information fading operation when predefined temporal conditions exist;
an association layer configured to correlate a classification tool output by known preferred misclassifications of the classification tool;
a scaling layer configured to weigh the output of a classification tool with a statistically greater reliability for a specified fault higher than the output of a classification tool with a statistically lower reliability;
a strengthening layer configured to generate an output by summation of classification tools which are in agreement;
a weakening layer configured to perform conflict resolution processing between at least two classification tools which disagree on the classification state of the system;
an evidence updating layer configured to supply secondary non-classification tool information which is used to support a classification state;
a tie-breaking layer configured to select between at least two equally likely classification states; and
a backscaling layer configured to manipulate values generated by the fusion tool into a standardized output value.

27. The invention according to claim 26, wherein the outputs from the classification tools are manipulated sequentially by at least a sub-set of the layers of the fusion tool, until a most likely candidate class has been refined as the fused output.

28. The invention according to claim 26, wherein the fusion tool increases and decreases weights values given to the classes according to strategies implemented in at least one layer of the fusion tool.

29. An information fusion product comprising:
a computer usable medium having computer readable program code embodied therein for causing different information from more than a single classification tool to be fused into an aggregated output representing a state of a system, the computer readable program code on the computer usable medium comprising:
computer readable program code for causing a computer to aggregate input information from more than a single classification tool, and to perform an information fading operation when predefined temporal conditions exist;
computer readable program code for causing a computer to correlate a classification tool output by known preferred misclassifications of the classification tool;
computer readable program code for causing a computer to weigh the output of a classification tool with a statistically greater reliability for a specified fault higher than the output of a classification tool with a statistically lower reliability;
computer readable program code for causing a computer to generate an output by summation of classification tools which are in agreement;
computer readable program code for causing a computer to perform conflict resolution processing between at least two classification tools which disagree on the classification state of the system;
computer readable program code for causing a computer to supply secondary non-classification tool information which is used to support a classification state;
computer readable program code for causing a computer to select between at least two equally likely classification states; and
computer readable program code for causing a computer to manipulate values into a standardized output value.

30. A computer implemented method for generating a fused information output by use of an information fusion tool comprising at least one of the steps of:
aggregating input information from more than a single classification tool;
performing an information fading operation when predefined temporal conditions exist;
correlating a classification tool output by known preferred misclassifications of the classification tool;
weighing the output of a classification tool with a statistically greater reliability for a specified fault higher than the output of a classification tool with a statistically lower reliability;

generating intermediate output by summation of classification tools which are in agreement;

performing conflict resolution processing between at least two classification tools when the at least two classification tools disagree on the classification state of the system;

supplying secondary non-classification tool information to support a classification state;

selecting between at least two equally likely classification states, when the at least two equally likely classification states exist; and manipulating values generated by the fusion tool into a standardized output value.

31. An computer implemented information fusion tool configured to receive information from a plurality of classification tools and to manipulate the received information to generate an output of fused information, the fusion tool including a combination of layers selected from a group consisting of:

a concurrency layer configured to aggregate input information from more than a single classification tool, and to perform an information fading operation when predefined temporal conditions exist:

an association layer configured to correlate a classification tool output by known preferred misclassifications of the classification tool;

a scaling layer configured to weigh the output of a classification tool with a statistically greater reliability for a specified fault higher than the output of a classification tool with a statistically lower reliability;

a strengthening layer configured to generate an output by summation of classification tools which are in agreement;

a weakening layer configured to perform conflict resolution processing between at least two classification tools which disagree on the classification state of the system;

an evidence updating layer configured to supply secondary non-classification tool information which is used to support a classification state;

a tie-breaking layer configured to select between at least two equally likely classification states; and a backscaling layer configured to manipulate values generated by the fusion tool into a standardized output value.

* * * * *

UNITED STATES PATENT AND TRADEMARK OFFICE
CERTIFICATE OF CORRECTION

PATENT NO. : 6,757,668 B1
DATED : June 29, 2004
INVENTOR(S) : Kai F. Goebel et al.

It is certified that error appears in the above-identified patent and that said Letters Patent is hereby corrected as shown below:

Column 22,
Line 2, please delete "ening layer includes a discount module is desinged such that" and insert -- ening layer includes a discount module designd such that --
Line 18, please delete "ciation matrix. The association matrix is calculated by" and insert -- ciation matrix, wherein the association matrix is calcualed by --
Line 21, please delete "where the diagonal elements are all one. The result of the" and insert -- where the diagonal elements are all one, wherein the result of the --

Column 23,
Line 10, please delete "bounded between a lower and upper value" and insert -- bounded between a lower and upper value; and --

Signed and Sealed this

Twenty-eighth Day of December, 2004

JON W. DUDAS
*Director of the United States Patent and Trademark Office*